United States Patent
Yoon

(10) Patent No.: US 9,750,016 B2
(45) Date of Patent: Aug. 29, 2017

(54) APPARATUS AND METHOD FOR DETERMINING D2D DATA RESOURCE FOR D2D COMMUNICATION

(71) Applicant: Innovative Technology Lab Co., Ltd., Seoul (KR)

(72) Inventor: Sung Jun Yoon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 100 days.

(21) Appl. No.: 14/819,232

(22) Filed: Aug. 5, 2015

(65) Prior Publication Data
US 2016/0044668 A1 Feb. 11, 2016

(30) Foreign Application Priority Data
Aug. 8, 2014 (KR) .................. 10-2014-0102572

(51) Int. Cl.
*H04W 72/04* (2009.01)
*H04W 72/12* (2009.01)
(Continued)

(52) U.S. Cl.
CPC .......... *H04W 72/0446* (2013.01); *H04L 5/14* (2013.01); *H04W 72/042* (2013.01); *H04W 72/1289* (2013.01); *H04W 76/023* (2013.01)

(58) Field of Classification Search
CPC .......... H04W 72/0446; H04W 72/042; H04W 72/1289; H04W 76/023
(Continued)

(56) References Cited

U.S. PATENT DOCUMENTS

2013/0109301 A1   5/2013  Hakola et al.
2014/0094183 A1   4/2014  Gao et al.
(Continued)

FOREIGN PATENT DOCUMENTS

WO   2013139041   9/2013
WO   2013191518   12/2013

OTHER PUBLICATIONS

"3rd Generation Partnership Project; Technical Specification Group Radio Access Network; Evolved Universal Terrestrial Radio Access (E-UTRA); Physical channels and modulation (Release 12)," Jun. 2014, pp. 1-121, 3GPP TS 36.211 V12.2.0, 3GPP Organizational Partners.

(Continued)

*Primary Examiner* — Ronald B Abelson

(57) ABSTRACT

A method and apparatus for supporting a device-to-device (D2D) communication between user equipments (UEs) are provided. The method includes: receiving, at a UE, configuration information associated with a D2D data transmission resource, the configuration information including information of a D2D data allocation period and being transmitted from an evolved NodeB (eNB); determining, at the UE, a D2D data transmission resource offset and a period associated with a D2D data transmission resource bitmap in each D2D data allocation period, the D2D data transmission resource bitmap including at least one bit corresponding to bit value "1"; and determining a pool of subframes corresponding to the bit value "1" of the D2D data transmission resource bitmap, the period associated with the D2D data transmission resource bitmap including the pool of subframes, the pool of subframes corresponding to D2D data transmission resources through which a D2D data transmission is capable.

18 Claims, 13 Drawing Sheets

(51) Int. Cl.
*H04W 76/02* (2009.01)
*H04L 5/14* (2006.01)

(58) Field of Classification Search
USPC .......................................................... 370/280
See application file for complete search history.

(56) References Cited

U.S. PATENT DOCUMENTS

| 2015/0085719 | A1* | 3/2015 | Yin ........................ H04L 1/1896 370/280 |
| 2016/0021625 | A1* | 1/2016 | Li ..................... H04W 72/1289 370/336 |
| 2016/0044724 | A1 | 2/2016 | Seo et al. |
| 2016/0198507 | A1 | 7/2016 | Wu et al. |
| 2016/0323870 | A1 | 11/2016 | Wei et al. |

OTHER PUBLICATIONS

"3rd Generation Partnership Project; Technical Specification Group Radio Access Network; Evolved Universal Terrestrial Radio Access (E-UTRA); Physical layer procedures (Release 12)," Jun. 2014, pp. 1-207, 3GPP TS 36.213 V12.2.0, 3GPP Organizational Partners.

English Translation of International Search Report for International Patent Application No. PCT/KR2015/008185, dated Nov. 24, 2015.

English Translation of Written Opinion for International Patent Application No. PCT/KR2015/008185, dated Nov. 24, 2015.

English Translation of International Search Report for International Patent Application No. PCT/KR2015/008317, dated Dec. 15, 2015.

English Translation of Written Opinion for International Patent Application No. PCT/KR2015/008317, dated Dec. 15, 2015.

International Search Report for International Patent Application No. PCT/KR2015/008185, dated Nov. 24, 2015.

Written Opinion for International Patent Application No. PCT/KR2015/008185, dated Nov. 24, 2015.

Intel Corporation, "eNB Controlled Resource Allocation for D2D Communication", R1-142017, 3GPP TSG-RAN WG1 Meeting #77, Seoul, Korea, May 19-23, 2014, pp. 1-6, 3GPP.

Samsung, "D2D synchronization procedure for resource pool configuration", R1-142119, 3GPP TSG RAN WG1 Meeting #77, Seoul, Korea, May 19-23, 2014, pp. 1-5, 3GPP.

Qualcomm Incorporated, "Signal Design for D2D Synchronization", R1-141453, 3GPP TSG-RAN WG1 #76BIS, Shenzhen, China, Mar. 31-Apr. 4, 2014 pp. 1-9, 3GPP.

International Search Report for International Patent Application No. PCT/KR2015/008317, dated Dec. 15, 2015.

Written Opinion for International Patent Application No. PCT/KR2015/008317, dated Dec. 15, 2015.

LG Electronics, "Discussion on Signaling for D2D Communication Resource Allocation", R1-142147, 3GPP TSG-RAN WG1 Meeting #77, Seoul, Korea, May 19-23, 2014, pp. 1-8, 3GPP.

Qualcomm Incorporated, "WF on SA content and design", R1-142653, 3GPP TSG RAN WG1 Meeting #77, Seoul, Korea, May 19-23, 2014, pp. 1-4, 3GPP.

Qualcomm Incorporated, "Status Report to TSG", RP-141015, 3GPP TSG RAN Meeting #64, Sophia Antipolis, France, Jun. 10-13, 2014, pp. 1-25, 3GPP.

* cited by examiner

APPARATUS AND METHOD FOR DETERMINING D2D DATA RESOURCE FOR D2D COMMUNICATION

CROSS-REFERENCE TO RELATED APPLICATION

This application claims priority from and the benefit of Korean Patent Application No. 10-2014-0102572, filed on Aug. 8, 2014, which is hereby incorporated by reference in its entirety.

BACKGROUND

1. Field

The present disclosure relates to wireless communication, and more particularly, to a method and apparatus for determining D2D data resources for Device to Device (D2D) communication.

2. Discussion of the Background

An amount of data transmitted through wireless communication has gradually increased. However, the frequency resources that service providers can provide are limited and have become increasingly saturated, and thus, mobile carriers continuously develop technologies for discovering new frequencies and improving efficient use of frequencies. One of the actively studied technologies to ease the frequency resource shortage and to create a new mobile communication service is Device-to-Device (D2D) communication technology.

D2D communication refers to a technology in which User Equipments (UEs) which are geometrically adjacent to one another, directly transmit and receive information without passing through an infrastructure, such as a base station. In the initial stage, the D2D communication technology was developed and standardized mostly in a non-licensed band such as Wi-Fi, Direct, Bluetooth, which have been already commercialized. However, recently, the development of technologies and standardization for supporting D2D communication in a cellular system that uses a licensed band, are underway. Representatively, the $3^{rd}$ Generation Partnership Project (3GPP), which is a mobile communication standardization association, actively conducts D2D communication technology standardization that is referred to as Proximity-based services (ProSe), which is one of the new technologies included in Long Term Evolution (LTE).

However, for the LTE wireless communication system, a method for using data resources for effectively providing D2D services has not been determined. Therefore, there is desire for a method of using resources for effectively supporting services.

SUMMARY

The present disclosure relates to a method and apparatus for determining a D2D data resource for a D2D data transmission.

The present disclosure also relates to a method and apparatus for determining information of indicating a D2D data resource for a D2D data transmission.

An exemplary embodiment provides a method of determining a device-to-device (D2D) data transmission resource for a user equipment (UE), the method including: receiving, at a UE, configuration information associated with a D2D data transmission resource, the configuration information including information of a D2D data allocation period and being transmitted from an evolved NodeB (eNB); determining, at the UE, a D2D data transmission resource offset and a period associated with a D2D data transmission resource bitmap in each D2D data allocation period, the D2D data transmission resource bitmap including at least one bit corresponding to bit value "1"; and determining a pool of subframes corresponding to the bit value "1" of the D2D data transmission resource bitmap, the period associated with the D2D data transmission resource bitmap including the pool of subframes, the pool of subframes corresponding to D2D data transmission resources through which a D2D data transmission is capable.

An exemplary embodiment provides a user equipment (UE) to determine a device-to-device (D2D) data transmission resource including: a wireless transceiver configured to: receive configuration information associated with a D2D data transmission resource, the configuration information including information of a D2D data allocation period and being transmitted from an evolved NodeB (eNB); and one or more processors configured to: determine a D2D data transmission resource offset and a period associated with a D2D data transmission resource bitmap in each D2D data allocation period, the D2D data transmission resource bitmap including at least one bit corresponding to bit value "1"; and determine a pool of subframes corresponding to the bit value "1" of the D2D data transmission resource bitmap, the period associated with the D2D data transmission resource bitmap including the pool of subframes, the pool of subframes corresponding to D2D data transmission resources through which a D2D data transmission is capable.

An exemplary embodiment provides a method of determining a device-to-device (D2D) data transmission resource for a user equipment (UE), the method including: receiving, at a UE, configuration information associated with a D2D data transmission resource, the configuration information including information of a D2D data allocation period, information of a D2D data transmission resource offset, and information of a D2D data transmission resource bitmap; determining, at the UE, a D2D data transmission resource in the D2D data allocation period among uplink subframes configured based on a radio frame structure of a Frequency Division Duplexing (FDD) scheme or a Time Division Duplexing (TDD) scheme, each radio frame according to the radio frame structure including 10 subframes. The determining of the D2D data transmission resource includes: determining, within the D2D data allocation period, a plurality of repetitions of a D2D data transmission resource bitmap based on the D2D data transmission resource offset.

A collision or interference between User Equipments (UEs) caused by transmission and/or reception of Device-to-Device (D2D) data may be reduced or minimized based on assignment of D2D data resources used for D2D communication. Therefore, the performance of the D2D data transmission may be improved.

DETAILED DESCRIPTION OF THE ILLUSTRATED EMBODIMENTS

Figure 1:
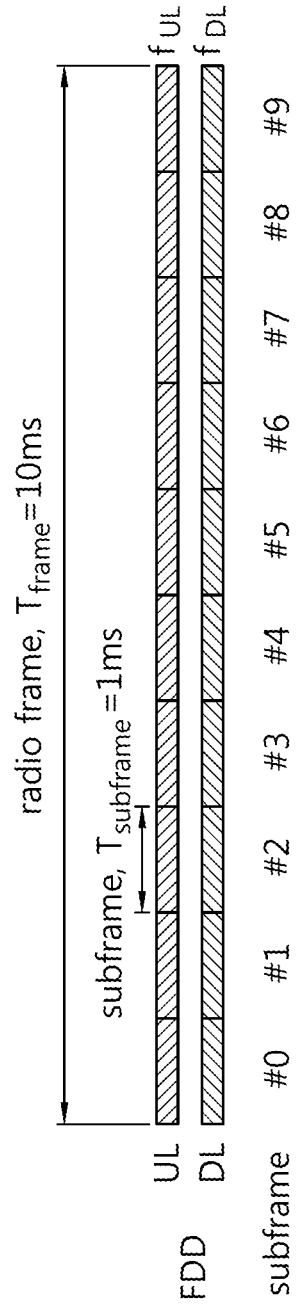
FIG. 1 is a conceptual diagram illustrating a structure of a radio frame according to an exemplary embodiment.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmits data, or may be performed in a User Equipment (UE) that is wireless linked to the corresponding network and capable of communicating with the network system.

FIG. 1 is a conceptual diagram illustrating a structure of a radio frame according to an exemplary embodiment.

FIG. 1 illustrates a structure of a radio frame for Frequency Division Duplexing (FDD)-based Device-to-Device (D2D) communication.

Figure 2:
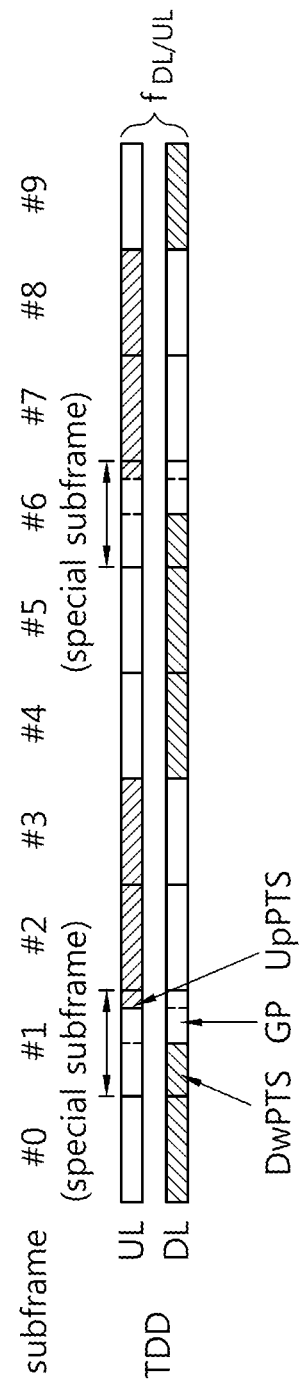
FIG. 2 is a conceptual diagram illustrating a structure of a radio frame according to an exemplary embodiment.

Referring to FIG. 1, a radio frame may include ten subframes. A single subframe includes two slots. A time (a length) in which a single subframe is transmitted is referred to as a Transmission Time Interval (TTI). Referring to FIG. 2, for example, a length of a single subframe (1 subframe) may be 1 ms, and a length of a single slot (1 slot) may be 0.5 ms.

A single slot may include a plurality of symbols in a time domain. For example, in a wireless system that uses Orthogonal Frequency Division Multiple Access (OFDMA) in a Downlink (DL), the symbol may be an Orthogonal Frequency Division Multiplexing (OFDM) symbol and in a wireless system that uses Single Carrier-Frequency Division Multiple Access (SC-FDMA) in an Uplink (UL), the symbol may be an SC-FDMA symbol. An expression associated with a symbol period of the time domain may not be limited by a multiple access scheme or name.

The number of symbols included in a single slot may be different based on a length of a Cyclic Prefix (CP). For example, in the case of a normal CP, seven symbols are included in a single slot, and in the case of an extended CP, six symbols are included in a single slot.

For FDD, when two component carrier frequencies exist, the two component carrier frequencies may be used for uplink transmission and downlink transmission, respectively. Hereinafter, from the perspective of a single D2D User Equipment (UE) (hereinafter referred to as a UE) that supports predetermined D2D communication, uplink transmission refers to data transmission from the UE to another UE or to a Base Station (BS), and uplink data refers to data transmitted from the UE to the other UE or the BS. Also, from the perspective of the UE, downlink transmission refers to data transmission from another UE or a BS to the UE, and downlink data refers to data transmitted from the other UE or the BS to the UE.

For duplexing scheme-based FDD, downlink transmission and uplink transmission may be executed in a cell, in parallel. Although uplink transmission and downlink transmission are parallelly executable in a single cell in FDD, downlink transmission and uplink transmission may not be executed in parallel, depending on whether a UE supports full duplex or half duplex. For example, when a UE operates as a full-duplex mode, the UE may receive downlink data and may transmit uplink data, in parallel. However, when the UE operates as a half-duplex mode, the UE may not simultaneously execute reception of downlink data and transmission of uplink data.

In D2D communication, when a UE operates as a full-duplex mode, the UE may receive downlink data from another UE or a BS, and may transmit uplink data to another UE or the BS, in parallel. However, when the UE operates as a half-duplex mode, the UE may not parallelly execute reception of downlink data from another UE or a BS, and transmission of uplink data to another UE or the BS.

FIG. 2 is a conceptual diagram illustrating a structure of a radio frame according to an exemplary embodiment.

FIG. 2 illustrates a structure of a radio frame for Time Division Duplexing (FDD)-based D2D communication.

Referring to FIG. 2, a radio frame structure for the TDD may include 10 subframes, like the radio frame structure of the FDD. A single subframe includes two slots. Basically, the radio frame structures are similar. However, a predetermined subframe among subframes included in the radio frames of the TDD may be defined as a special subframe. The special subframe may be a time resource for switching uplink transmission and downlink reception. The special subframe may be formed of a downlink part (DwPTS), a Guard Period (GP), and an uplink part (UpPTS).

In TDD, only a single carrier frequency exists, and thus, uplink transmission and downlink transmission may be distinguished based on time in a single cell. For example, on a single carrier frequency, a UE that executes D2D communication, transmits uplink data to another UE or a BS in a time resource for uplink transmission and receives downlink data from another UE or the BS in a time resource for downlink transmission.

Figure 3:
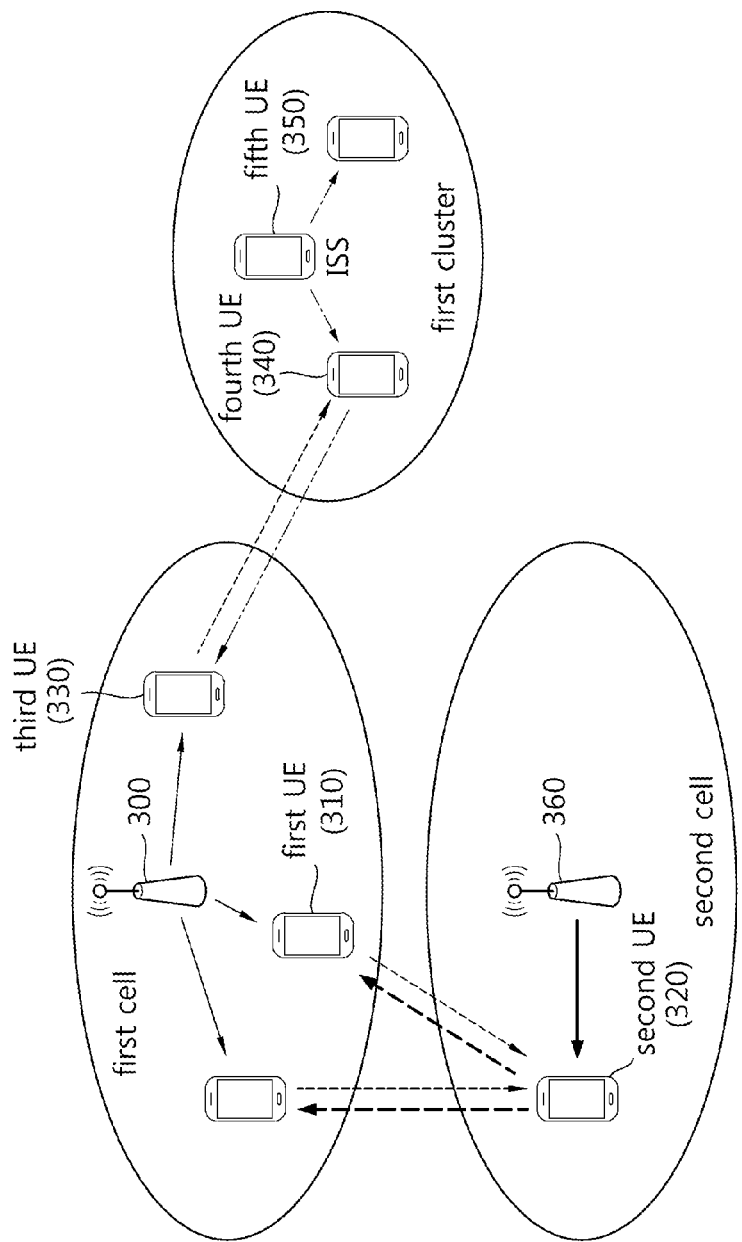
FIG. 3 is a conceptual diagram illustrating D2D communication according to an exemplary embodiment.

FIG. 3 is a conceptual diagram illustrating D2D communication.

D2D communication refers to a technology in which UEs directly receive and transmit data. Hereinafter, a UE disclosed in exemplary embodiments is assumed to support D2D communication.

When UEs located close to one another execute D2D communication in a cellular system, loads on an evolved NodeB (eNodeB) may be dispersed. In addition, when UEs execute D2D communication, a UE transmits data a relatively short distance, and thus, transmission power consumption and transmission latency of the UE may decrease. In addition, from the perspective of the whole system, the existing cellular-based communication and the D2D communication use identical resources, and thus, frequency utilization efficiency may be improved.

The D2D communication may be classified into a communication method of a UE located within a network coverage (base station coverage) and a communication method of a UE located outside a network coverage (base station coverage).

Referring to FIG. 3, the communication between a first UE 310 located in a first cell and a second UE 320 located in a second cell may be D2D communication between a UE included in a network coverage and a UE included in a network coverage. The communication between a fourth UE 340 located in the first cluster and a fifth UE 350 located in the first cluster may be D2D communication between the UEs located outside a network coverage. The fifth UE 350 is the cluster header, and the cluster header may operate as an independent Synchronization Source (ISS) for synchronization of an out-of coverage UE.

The D2D communication may include a discovery process that executes discovery for communication between UEs and a direct communication process in which UEs transmit and receive control data and/or traffic data.

The D2D communication may be used for various purposes. For example, D2D communication within a network coverage and D2D communication outside a network coverage may be used for public safety. The D2D communication outside a network coverage may be used for only the public safety. D2D communication in a BS coverage may be executed based on a BS. For example, a BS 300 may transmit D2D resource allocation information to the first UE 310 located in the BS coverage. The D2D resource allocation information may include allocation information associated with a D2D communication resource for D2D communication between the first UE 310 and another UE (for example, a second UE 320). The first UE 310 that receives the D2D resource allocation information from the BS, may transmit the D2D resource allocation information to the second UE 320 outside the BS coverage. The second UE 320 may be a UE located outside the BS coverage, from the perspective of the BS 300 of a first cell. The first UE 310 and the second UE 320 may execute D2D communication based on the D2D resource allocation information. Particularly, the second UE 320 may obtain information associated with the D2D communication resource of the first UE 310. The second UE 320 may receive traffic data and/or control data transmitted from the first UE 310, through a resource indicated by the information associated with the D2D communication resource of the first UE 310.

In the D2D communication, a UE may transmit control data to another UE. A separate channel (for example, a Physical Uplink Control Channel (PUCCH)) for transmitting control data may not be defined in the D2D communication. When the control channel is not defined in the D2D communication, a UE may use various methods for transmitting control data for D2D communication. In the D2D communication, the control data may be expressed as Scheduling Assignment (SA) information. In the D2D communication, actual traffic data (e.g., data transmitted through shared channel, such as physical sidelink shared channel) distinguished from control data, may be expressed as D2D data.

The D2D communication within network coverage may be expressed as first mode communication, and the D2D communication outside network coverage may be expressed as second mode communication. In the first mode communication, a BS or a relay node schedules accurate information associated with resources for the D2D communication between UEs. Particularly, according to the first mode communication, a BS transmits, to a UE, resource allocation information associated with control data (or SA data) and resource allocation information associated with traffic data (or D2D data).

According to the second mode communication, a UE may directly schedule resources for D2D communication, based on a D2D resource pool. Particularly, in the second mode communication, resource allocation information for transmission of control data and resource allocation information associated with traffic data may be selected by a UE from the D2D resource pool. The D2D resource pool may be pre-configured or semi-statically allocated.

Within the network coverage, the first mode communication or the second mode communication may be used as a D2D communication. Outside the network coverage, the second mode communication may be used as a D2D communication.

A D2D communication resource for transmitting or receiving control data or traffic data for D2D communication, may roughly include a D2D SA resource for transmitting control data and a D2D data resource for transmitting traffic data.

The D2D data resource may be a resource used for transmitting and/or receiving traffic data in D2D communication.

The D2D data resource may be defined based on a subframe unit in a time axis and based on a Resource Block (RB) unit in a frequency axis, but this may not be limited thereto. The D2D data resource may be a candidate resource that may transmit traffic data by a D2D UE. That is, the D2D data resource may be expressed as a D2D data candidate resource or a D2D data transmission opportunity. A UE may transmit traffic data through a part or the entirety of the D2D data resource. The D2D data resource that is actually used by a UE for transmitting traffic data may be expressed as a selected D2D data resource.

The D2D SA resource may be a resource that is used for transmitting and/or receiving control data in D2D communication. In the same manner, the D2D SA resource may be defined based on a subframe unit in a time axis and based on a Resource Block (RB) unit in a frequency axis, but this may not be limited thereto. The D2D SA resource may be a candidate resource that may transmit control data by a D2D UE. That is, the D2D SA resource may be expressed as a D2D SA candidate resource or a D2D SA transmission opportunity. The UE may transmit control data through a part of the D2D SA resource. The D2D SA resource that the UE actually uses for transmitting control data, may be expressed as a selected D2D SA resource.

A selected D2D data resource and a selected D2D SA resource may be defined, respectively, by patterns on the D2D data resource and the D2D SA resource. The pattern associated with the selected D2D data resource and/or the pattern associated with the selected D2D SA resource may be expressed as a Resource Pattern for Transmission (RPT), and particularly, may be expressed as a Time Resource Pattern for Transmission (T-RPT) on the time axis.

A set of D2D data resources may be expressed as a D2D data resource pool, and a set of D2D SA resources may be expressed as a D2D SA resource pool. The D2D resource pool may be used as a concept including the D2D data resource pool and the D2D SA resource pool.

Hereinafter, an exemplary embodiment will disclose a method of defining a D2D data resource in a D2D data allocation period, in detail. Hereinafter, a D2D data resource may be classified into a D2D data transmission resource used for D2D data transmission and a D2D data reception resource used for D2D data reception.

Figure 4:
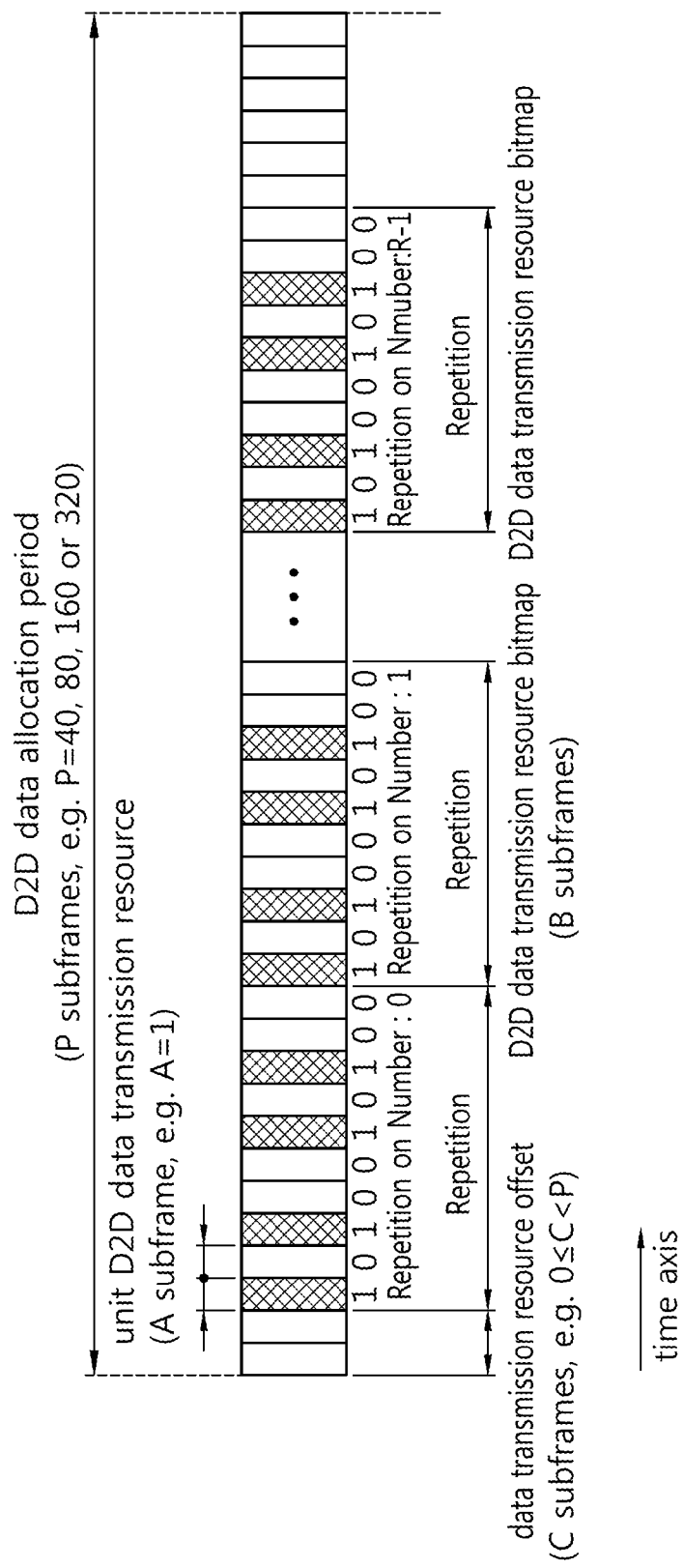
FIG. 4 is a conceptual diagram illustrating a resource allocation unit, defined in D2D communication according to an exemplary embodiment.

FIG. 4 is a conceptual diagram illustrating a resource allocation unit, defined in D2D communication according to an exemplary embodiment.

FIG. 4 discloses a D2D data transmission resource defined in a D2D data allocation period.

Referring to FIG. 4, a D2D data allocation period 400 may be a predetermined time unit for allocating D2D data transmission resources. The D2D data allocation period 400 may be a single value defined in advance, or may be a value selected from among a plurality of D2D data allocation period values defined in advance. For example, a D2D data allocation period may be 40 ms, 80 ms, 160 ms, or 320 ms When the D2D data allocation period 400 is executed in subframes, the D2D data allocation period may be 40, 80, 160, or 320 subframe units.

A D2D data transmission resource (or a transmission opportunity) may be defined based on at least one subframe unit within the D2D data allocation period 400. The D2D data transmission resource defined based on at least one subframe unit may be expressed using a term called a unit D2D data transmission resource 420. That is, the D2D data transmission resource defined in the D2D data allocation period may be a set of at least one unit D2D data transmission resource 420. The unit D2D data transmission resource 420 may be defined based on a single subframe unit, as illustrated in FIG. 4, and may be defined based on a plurality of subframe units. Hereinafter, descriptions will be provided under an assumption of the case in which the unit D2D data transmission resource 420 is configured based on a single subframe.

A single D2D data transmission unit may be transmitted on the unit D2D data transmission resource 420. The D2D data transmission unit may be a MAC Protocol Data Unit (PDU) in a MAC layer or a data Transport Block (TB) in a physical layer.

According to an exemplary embodiment, the D2D data transmission resource 420 may be allocated by taking into consideration a D2D data transmission resource offset 440 in the D2D data allocation period 400, a D2D data transmission resource bitmap 460, and the number of repetitions 480 of a D2D data resource indication bitmap.

The D2D data transmission resource offset 440 may indicate the allocation location of a first D2D data transmission resource bitmap in the D2D data allocation period. The D2D data transmission resource offset 440 may be a time interval corresponding to N subframes on a time axis. The D2D data transmission resource offset 440 may indicate a starting point of a D2D data transmission resource that is based on a D2D data transmission resource bitmap. Particularly, on subframes after a point indicated as the D2D data transmission resource offset 440, a D2D data transmission resource that is based on the D2D data transmission resource bitmap 460 is repeated as many as the number of repetitions 480 of a D2D data transmission resource bitmap.

The D2D data transmission resource bitmap 460 may be defined on a subframe unit including B subframes, in time axis. The subframe unit that defines the D2D data transmission resource bitmap 460 may be expressed as a bitmap subframe unit.

Bits on the D2D data transmission resource bitmap 460 correspond to subframes included in the bitmap subframe unit, respectively, and the number of subframes included in the bitmap subframe unit may be the length of the D2D data transmission resource bitmap 460. For example, when the number of subframes included in the bitmap subframe unit is B, the length of the D2D data transmission resource bitmap 460 may be B. Although B may be a predetermined value determined by taking into consideration a D2D data resource allocation period among multiples of 8 or multiples of 10, this may not be limited thereto, and various values may be used. For example, when the length of a single radio frame is 10 ms, the length of the D2D data transmission resource bitmap 460 is defined as 10, or may be indicated as a form in which it is repeated in the D2D data allocation period 400. Alternatively, the length of the D2D data transmission resource bitmap 460 may be defined as 5, or may be indicated as a form in which it is repeated in the D2D data allocation period 400. Alternatively, the length of the D2D data transmission resource bitmap 460 may be defined as 20, or may be indicated as a form in which it is repeated in the D2D data allocation period 400.

When the D2D data transmission resource 420 corresponds to a plurality of subframes, bits on the D2D data transmission resource bitmap 460 may correspond to unit D2D data transmission resources (plurality of subframes) included in the bitmap subframe unit, respectively. Hereinafter, an exemplary embodiment will provide descriptions under an assumption that bits of the D2D data transmission resource bitmap 460 correspond to subframes included in a bitmap subframe unit, respectively.

Values of the plurality of bits included in the D2D data transmission resource bitmap 460 may be 0 or 1. When a bit value corresponding to a predetermined subframe of the D2D data transmission resource bitmap 460 is 1, the predetermined subframe may be a D2D data transmission resource. When a bit value corresponding to a predetermined subframe of the D2D data transmission resource bitmap 460 is 0, the predetermined subframe may be a non-D2D data transmission resource. Conversely, when a bit value corresponding to a predetermined subframe on the D2D data transmission resource bitmap 460 is 0, the predetermined subframe may be a D2D data transmission resource, and when a bit value corresponding to a predetermined subframe on the bit map is 1, the predetermined subframe may be a non-D2D data transmission resource.

In FIG. 4, the length B of the D2D data transmission resource bitmap 460 is 10, and the D2D data transmission resource bitmap 460 may be '1010010100.' The bits of the bitmap may sequentially correspond to 10 subframes, respectively, from the most significant bit to the least significant bit. That is, the length of the D2D data transmission resource bitmap 460 may be 10, and the D2D data transmission resource bitmap 460 may indicate, as a D2D data transmission resource, 4 subframes that correspond to a bit value of 1, from among the 10 subframes.

The number of repetitions 480 of a D2D data transmission resource bitmap may be the number of repetitions of a bitmap subframe unit. When the length of the D2D data transmission resource bitmap 460 is B, the number of repetitions R of a bitmap subframe unit on a time axis may be determined as $0<R\le\lfloor(P-C)/B\rfloor$. Here, P denotes a D2D data allocation period, and C denotes a D2D data transmission resource offset.

For example, as illustrated in FIG. 4, when the length B of the D2D data transmission resource bitmap 460 is 10 ms, the D2D data resource offset 440 is 2 ms, the D2D data resource allocation period 400 is 160 ms (or 160 subframes), the number of repetitions R 480 of the D2D data transmission resource bitmap may be a value in a range of $0<R\le15$. That is, at most 15 repetitions may be executed. When the number of repetitions of the D2D data transmission resource bitmap is less than 15, a D2D data transmission resource based on the D2D data transmission resource bitmap 460 may be allocated within only a few subframes in the D2D data resource allocation period 400.

As the D2D data allocation period P 400 becomes long, and the D2D data transmission resource offset C 440 and the length B of the D2D data transmission resource bitmap 460 becomes short, the number of repetitions 480 of the D2D data transmission resource bitmap becomes high. By taking into consideration the maximum value of the number of repetitions 480 of the D2D data transmission resource bitmap, a D2D data transmission resource may be allocated in the D2D data allocation period 400. For example, when P=320, C=0, and B=8, $0<R\le40$. In this instance, as the number of repetitions 480 of the D2D data transmission resource bitmap, one out of 1 to 40 may be selected. Based on the selected value corresponding to the number of repetitions 480 of the D2D data transmission resource bitmap, a D2D data transmission resource may be allocated in the D2D data allocation period 400.

Information associated with the D2D data allocation period 400, information associated with the D2D data transmission resource offset 440, information associated with the D2D data transmission resource bitmap 460, and information associated with the number of repetitions 480 of the D2D data transmission resource bitmap may be common information for UEs included in a UE set.

Information for allocating a D2D data transmission resource to an individual UE or a UE group, may be UE-specific information of a UE group-specific information. The information for allocating the D2D data transmission resource 420 to an individual UE or a UE group may be expressed as a term called D2D data transmission resource allocation information. A method of allocating the D2D data transmission resource 420 to an individual UE or a UE group based on UE-specific information or UE group-specific information will be described based on the D2D data transmission resource allocation information.

The UE set may be defined by various schemes. For example, in a first mode communication (for example, D2D communication within a network coverage), a UE set may be a set of UEs that execute D2D communication based on information associated with the D2D data allocation period 400 determined based on a BS, information associated with the D2D data transmission resource offset 440, information associated with the D2D data transmission resource bitmap 460, information associated with the number of repetitions 480 of the D2D data transmission resource bitmap, and the D2D data transmission resource allocation information. The UE set of the first mode communication may include a UE in a BS coverage, and a UE that is outside the BS coverage and executes D2D communication with the UE in the BS coverage.

In a second mode communication (for example, D2D communication outside a network coverage (the second mode communication may be applicable in the D2D communication within the network coverage as described above)), a UE set may be a set of UEs that receive information associated with the D2D data allocation period 400 determined based on an ISS, information associated with the D2D data transmission resource offset 440, information associated with the D2D data transmission resource bitmap 460, information associated with the number of repetitions 480 of the D2D data transmission resource bitmap, and the D2D data transmission resource allocation information. For example, the UE set of the second mode communication may include a UE within an Independent Synchronization Source (ISS) coverage, and a UE that is outside the ISS coverage and executes D2D communication with the UE within the ISS coverage. Herein, the ISS may be a D2D synchronization source that is different from an eNodeB from among D2D synchronization sources, and which do not transmit synchronization from other D2D synchronization sources but transmit synchronization of itself, and may be a UE that is not be scheduled by another source (a BS or another UE), is used as a reference for operation synchronization of D2D communication, and schedules another UE.

Hereinafter, common information for UEs included in a UE set, such as information associated with the D2D data allocation period 400, information associated with the D2D data transmission resource offset 440, information associated with the D2D data transmission resource bitmap 460, and information associated with the number of repetitions 480 of the D2D data transmission resource bitmap, may be expressed as cell-specific information. Also, like the D2D data transmission resource allocation information, information for allocating a D2D data transmission resource to an individual UE or a UE group, may be expressed as UE group-specific information or UE-specific information.

Figure 5:
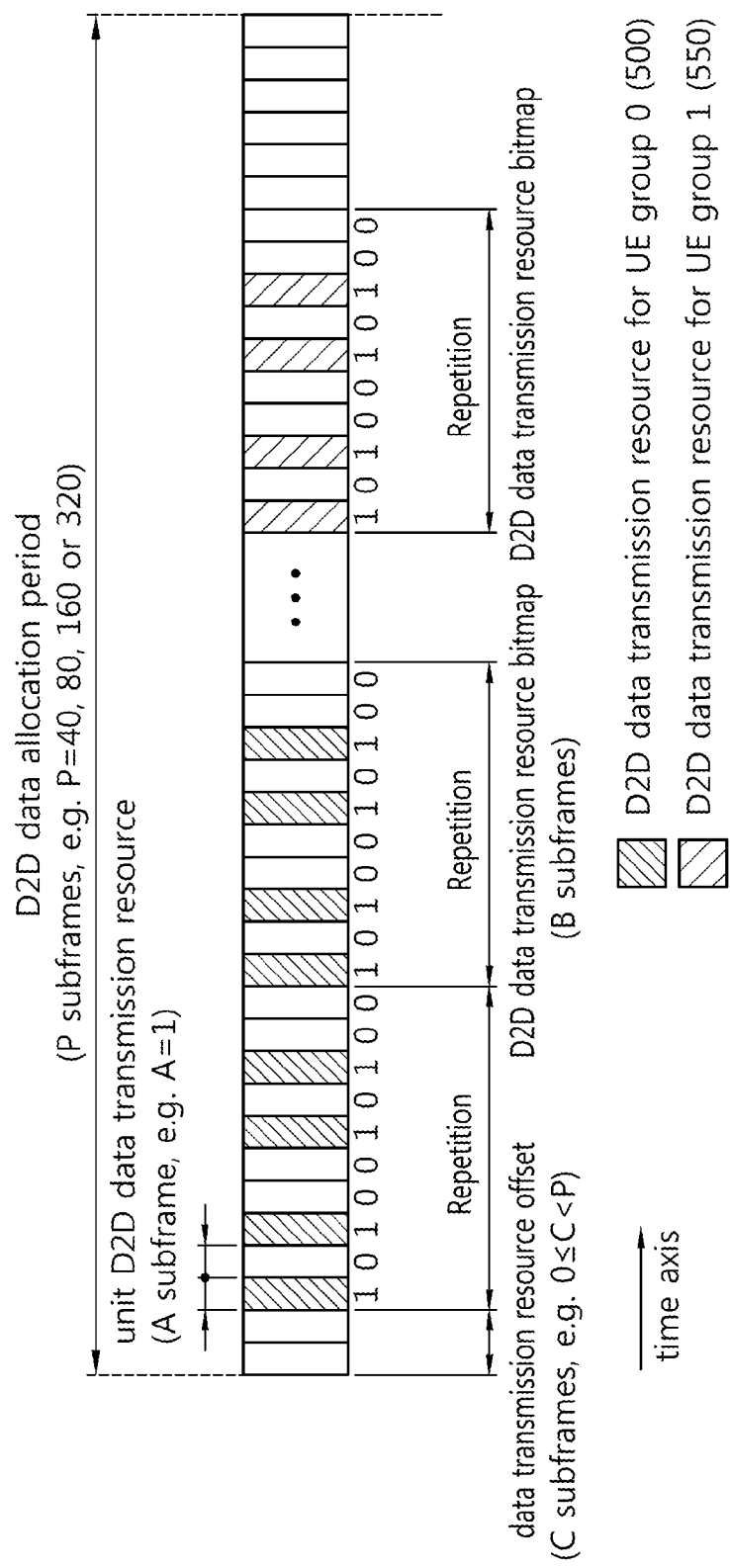
FIG. 5 is a conceptual diagram illustrating a method of allocating a D2D data transmission resource, to a User Equipment (UE) or a UE group, according to an exemplary embodiment.

FIG. 5 is a conceptual diagram illustrating a method of allocating a D2D data transmission resource, to a UE or a UE group, according to an exemplary embodiment.

FIG. 5 discloses a method of allocating a D2D data transmission resource to a UE or a UE group. Hereinafter, for ease of description, descriptions will be provided from the perspective of a UE group, but a UE group may be a grouping unit including at least one UE, and may be construed as a single UE.

Referring to FIG. 5, the number of repetitions of a D2D data transmission resource bitmap may be R. For ease of description, it is assumed that R times-repeated D2D data transmission resource bitmaps are sequentially indexed with $B_0$ through $B_{R-1}$. D2D data transmission subframes corresponding to the R times-repeated D2D data transmission resource bitmaps may be allocated to a UE group.

As illustrated in FIG. 5, when the number of UE groups is 2, x times-repeated D2D data transmission resource bitmaps (D2D data transmission resource bitmaps indexed with $B_0$ to $B_{x-1}$) from among the R times-repeated D2D data transmission resource bitmaps, may indicate a D2D data transmission resource 500 for UE group 0. The remaining R-x times-repeated D2D data transmission resource bitmaps (D2D data transmission resource bitmaps indexed with $B_x$ to $B_{R-1}$) may indicate a D2D data transmission resource 550 of UE group 1.

As another method, it is assumed that the number of repetitions of a D2D data transmission resource bitmap is R, and the number of UE groups is N. The number of repetitions of a D2D data transmission resource bitmap for UE group 0 to UE group N−1, may be defined as $r_0, r_1, \ldots, r_{N-1}$, and $r_0+r_1+ \ldots +r_{N-1}=R$. In this instance, the D2D data transmission resource for UE group 0 may be determined based on $r_0$ times-repeated D2D data transmission resource bitmaps. Alternatively, the D2D data transmission resource for UE group 1 may be determined based on $r_1$ times-repeated D2D data transmission resource bitmaps, and a D2D data transmission resource for UE group N−1 may be determined based on $r_{N-1}$ times-repeated D2D data transmission resource bitmaps. Although the D2D data transmission resources for UE group 0 to UE group N−1 may be sequentially allocated in a D2D data allocation period, this may not be limited thereto, and the D2D data transmission resources for UE group 0 to UE group N−1 may be allocated based on various combinations in the D2D data allocation period.

A D2D data transmission subframe allocated to a UE group may be determined based on various methods.

The D2D data transmission subframe may be allocated to a UE group based on a UE identifier.

A UE group may be grouped based on an identifier of a UE. A D2D data transmission subframe allocated for each UE group may be indicated. When the number of repetitions of a D2D data transmission resource bitmap is R, UEs are grouped by executing a modular arithmetic with respect to a value corresponding to a UE identifier, and a D2D data transmission subframe allocated to the UE group may be determined. A UE identifier may be UE group-specific information or UE-specific information allocated to a UE through a D2D SA transmission resource.

The number of repetitions of a D2D data transmission resource bitmap for UE group 0 to UE group N−1, may be defined as $r_0, r_1, \ldots, r_{N-1}$, and $r_0+r_1+ \ldots +r_{N-1}=R$. A UE that has a remainder of 0 obtaining after executing a modular N arithmetic with respect to the value of a UE identifier, is classified into UE group 0, and a UE that has a remainder of 1 obtaining after executing a modular N arithmetic with respect to the value of a UE identifier, is classified into UE group 1. That is, when a UE that has a remainder of n obtaining after executing a modular N arithmetic may be classified into UE group n.

A UE included in UE group 0 may be allocated with a D2D data transmission resource that is based on $r_0$ times-repeated D2D data transmission resource bitmaps, a UE included in UE group 1 may be allocated with a D2D data transmission resource that is based on $r_1$ times-repeated D2D data transmission resource bitmaps, and a UE included in UE group n may be allocated with a D2D data transmission resource that is based on times-repeated D2D data transmission resource bitmaps.

$r_0, r_1, \ldots,$ and $r_{N-1}$ may be defined in advance. For example, each of $r_0, r_1, \ldots,$ and $r_{N-2}$ may be $\lfloor R/N \rfloor$ or $\lceil R/N \rceil$, and $r_{N-1}$ may be $R-(r_0+r_1+ \ldots +r_{N-2})$.

For example, when R=15 and N=2, a modular 2 arithmetic may be executed with respect to the value of a UE identifier. When a value obtained after executing the modular 2 arithmetic with respect to the value of the UE identifier is 0, a D2D data resource determined based on the number of repetitions of a D2D data transmission resource bitmap corresponding to $\lceil R/N \rceil=8$, may be allocated to a UE. When the value obtained after executing the modular 2 arithmetic with respect to the value of the UE identifier is 1, a D2D data resource determined based on the number of repetitions of a D2D data transmission resource bitmap corresponding to $R-\lceil R/N \rceil=7$, may be allocated to the UE.

As another method, a D2D data transmission subframe may be allocated to a UE group, based on an RRC signaling.

A method of allocating a D2D data transmission resource to a UE group through an RRC signaling will be described.

Information associated with a D2D data transmission subframe to be used from among D2D data transmission subframes that are based on R times-repeated D2D data transmission resource bitmaps, may be transmitted to a UE group, through an RRC signaling.

As described above, when the D2D data transmission resource bitmap is repeated R times, the R times-repeated D2D data transmission resource bitmaps may be indexed with $B_0$ to $B_{R-1}$. Information indicating a UE group for which a D2D data transmission subframe based on each of the D2D data transmission resource bitmaps corresponding to $B_0$ to $B_{R-1}$, is to be used, may be transmitted through an RRC signaling. For example, an upper bitmap for indicating D2D data transmission resource bitmaps corresponding to $B_0$ to $B_{R-1}$ may be transmitted through an RRC signaling. That is, R-bit bitmap may be a bitmap for indicating each of the D2D data transmission resource bitmaps corresponding to $B_0$ to $B_{R-1}$. For example, when R is 5, '11000' may indicate D2D data transmission resource bitmaps corresponding to $B_0$ to $B_{R-1}$. That is, when a bitmap for indicating each D2D data transmission resource bitmap for a predetermined UE group is '11000', the predetermined UE group may be allocated with a D2D data transmission resource that is based on D2D data transmission resource bitmaps corresponding to $B_0$ and $B_1$.

As another method, a D2D data transmission subframe allocated to a UE may be allocated to a UE or a UE group, based on a D2D SA resource.

Information associated with a D2D data transmission subframe to be used from among D2D data transmission subframes, which are respectively based on R times-repeated D2D data transmission resource bitmaps, may be transmitted, through the D2D SA resource.

As described above, when the D2D data transmission resource bitmap is repeated R times, the R times-repeated D2D data transmission resource bitmaps may be indexed with $B_0$ to $B_{R-L}$. Information indicating a UE or a UE group for which a D2D data transmission subframe based on each of the D2D data transmission resource bitmaps corresponding to B0 to BR−1, is to be used, may be transmitted through the D2D SA resource.

Alternatively, from among R times-repeated D2D data transmission resource bitmaps, a combination of D2D data transmission resource bitmaps that may be allocated to a UE or a UE group may be configured, and the configured combination may be used for the UE or the UE group. For example, when the number of UEs or UE groups is 2, a D2D data resource determined based on $\lfloor R/2 \rfloor$ (or $\lceil R/2 \rceil$), which is the number of repetitions of a D2D data transmission resource bitmap, may be allocated to a first UE (or a first UE group). For example, a D2D data resource determined based on $\lceil R/2 \rceil$ (or $\lfloor R/2 \rfloor$), which is the remaining number of repetitions of a D2D data transmission resource bitmap, may be allocated to a second UE (or a second UE group).

Information associated with a D2D data transmission subframe to be used from among D2D data transmission subframes that are respectively based on R times-repeated D2D data transmission resource bitmaps transmitted through a D2D SA resource, may be transmitted by being included in a T-RPT indication information transmitted through the D2D SA resource, or may be transmitted to a UE together with the T-RPT indication information.

A D2D data transmission subframe allocated to a UE group may be determined based on various methods.

Figure 6:
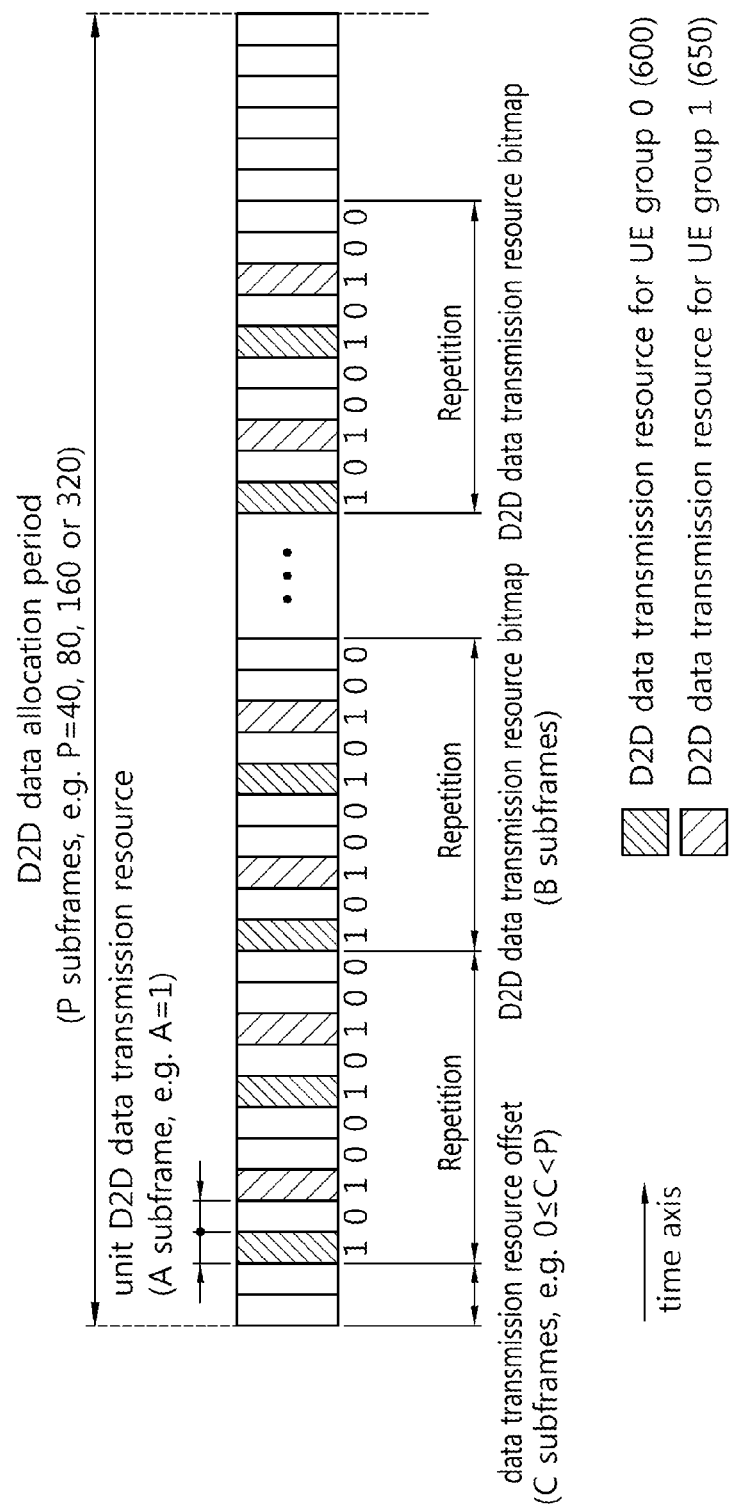
FIG. 6 is a conceptual diagram illustrating a method of allocating a D2D data transmission resource, to a UE or a UE group, according to an exemplary embodiment.

FIG. 6 is a conceptual diagram illustrating a method of allocating a D2D data transmission resource, to a UE or a UE group, according to an exemplary embodiment.

Referring to FIG. 6, an index may be allocated for each unit D2D data transmission resource that forms a D2D data transmission resource allocated in a D2D data allocation period. A D2D data transmission resource may be allocated to a UE group, based on an index associated with a unit D2D data transmission resource.

The UE group may be determined based on a UE identifier. The UE identifier may be allocated to a UE through a D2D SA transmission resource, and the UE group may be configured based on the UE identifier. To configure N UE groups, a modular N arithmetic may be executed with respect to the value of a UE identifier. When the result of the modular N arithmetic is 0, it indicates UE group 0. When the result of the modular N arithmetic is 1, it indicates UE group 1. When the result of the modular N arithmetic is N−1, it indicates UE group N−1.

When unit D2D data transmission resources are sequentially indexed, a total of M unit D2D data transmission resources from 0 to M−1 may be defined. Unit D2D data transmission resources corresponding to even-numbered indices from among the unit D2D data transmission resources corresponding to indices from 0 to M−1, may be a D2D data transmission resource 600 for UE group 0. Alternatively, unit D2D data transmission resources corresponding to odd-numbered indices from among the unit D2D data transmission resources corresponding to indices from 0 to M−1, may be a D2D data transmission resource 650 for UE group 1.

As another example, a D2D data transmission resource for each of three UE groups may be determined by a modular arithmetic. Unit D2D data transmission resources that have a modular arithmetic result of 0, from among the unit D2D data transmission resources corresponding to indices from 0 to M−1, may be a D2D data transmission resource for UE group 0. Unit D2D data transmission resources that have a modular arithmetic result of 1, from among the unit D2D data transmission resources corresponding to indices from 0 to M−1, may be a D2D data transmission resource for UE group 1. Unit D2D data transmission resources that have a modular arithmetic result of 2, from among the unit D2D data transmission resources corresponding to indices from 0 to M−1, may be a D2D data transmission resource for UE group 2.

In addition, a D2D data transmission subframe may be allocated to a UE group, based on an RRC signaling or a D2D SA transmission resource.

For example, when the number of UE groups is N, $\lceil \log_2 N \rceil$ bits may be transmitted to a UE through an RRC signaling or a D2D SA transmission resource, as UE group indication information for indicating a UE group. When the number of UE groups is 2, UE group indication information may be 1 bit. When UE group indication information that a UE receives is 0, a UE group that includes the UE may be UE group 0. Conversely, when UE group indication information that a UE receives is 1, a UE group that includes the UE may be UE group 1.

As described above, after a UE group is configured for each UE, based on an RRC signaling or a D2D SA transmission resource, a D2D data transmission resource may be allocated to each UE group. For example, unit D2D data transmission resources corresponding to even-numbered indices from among the unit D2D data transmission resources corresponding to indices from 0 to M−1, may be the D2D data transmission resource 600 for UE group 0. Alternatively, unit D2D data transmission resources corresponding to odd-numbered indices from among the unit D2D data transmission resources corresponding to indices from 0 to M−1, may be the D2D data transmission resource 650 for UE group 1.

Information associated with a UE group including a UE may be transmitted by being included in T-RPT indication information transmitted through a D2D SA resource, or may be transmitted to a UE together with the T-RPT indication information.

Hereinafter, FIG. 7 and FIG. 8 disclose a method of transmitting cell-specific information and UE-specific information (or UE group-specific information).

The cell-specific information may be information associated with a D2D data allocation period, information associated with a D2D data transmission resource offset, information associated with a D2D data transmission resource bitmap, information associated with the number of repetitions of a D2D data transmission resource bitmap, or the like.

The UE-specific information (or UE group-specific information) may be D2D data transmission resource allocation information, which is information for allocating a D2D data transmission resource to an individual UE or a UE group.

Figure 7:
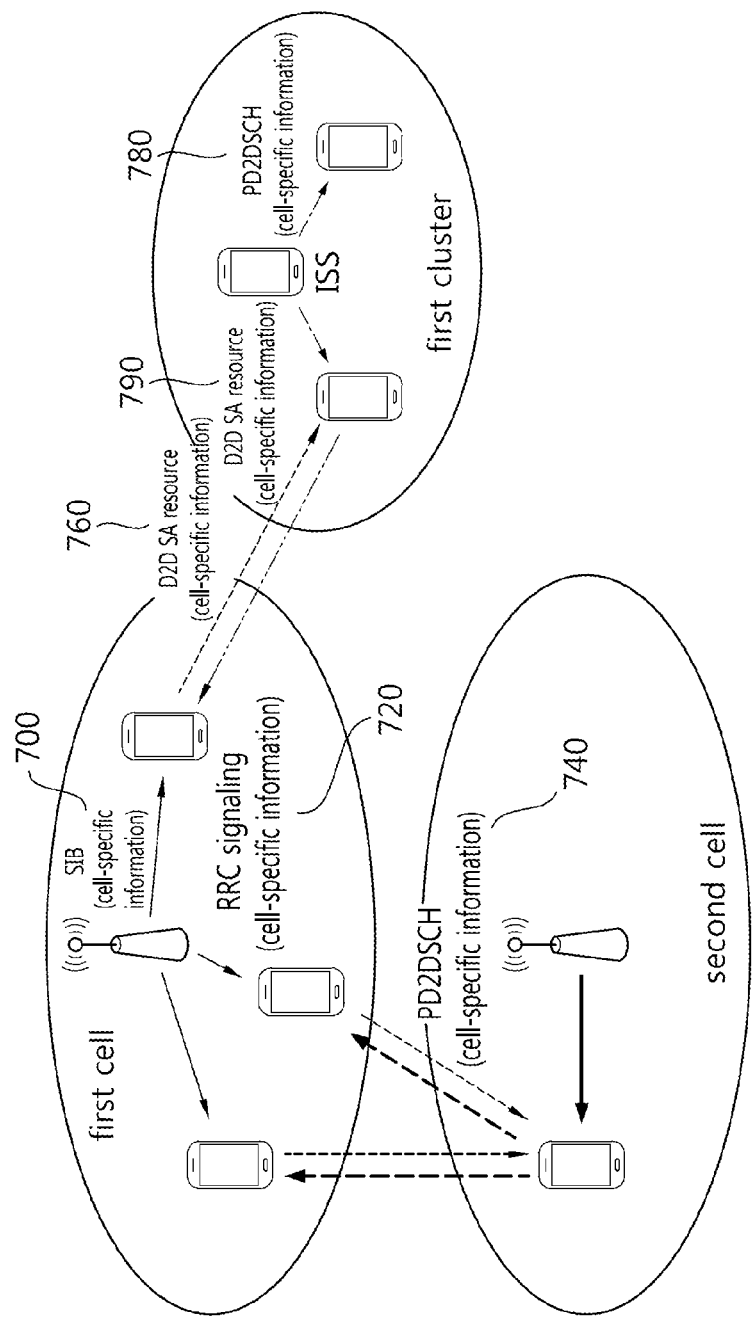
FIG. 7 is a conceptual diagram illustrating a method of transmitting information for D2D communication according to an exemplary embodiment.

FIG. 7 is a conceptual diagram illustrating a method of transmitting information for D2D communication according to an exemplary embodiment.

FIG. 7 discloses a method of transmitting cell-specific information for D2D communication.

In the case of first mode communication, cell-specific information for D2D communication may be transmitted through a System Information Block (SIB) 700. For example, the SIB 700 that is transmitted from a BS to a UE in coverage (in-coverage UE) may include cell-specific information for D2D communication. Alternatively, the BS may transmit cell-specific information for D2D communication to the UE through a higher layer signaling. For example, the BS may transmit cell-specific information to an RRC-connected UE, through an RRC signaling 720.

The cell-specific information for D2D communication, transmitted from the BS to a UE through the SIB 700 or the higher layer signaling 720, may be transmitted to another UE through a specific channel 740 for D2D communication (for example, a Physical Device to Device Shared Channel (PD2DSCH)). For example, an in-coverage UE adjacent to the BS may transfer cell-specific information that is received through the SIB 700 or the higher layer signaling 720, to a UE located in an edge of a cell (an edge-of-cell-coverage UE) through the PD2DSCH 740.

As another method, cell-specific information for D2D communication which is transmitted from the BS to a UE through the SIB 700 or the higher layer signaling 720, may be transmitted to another UE through a D2D SA resource. For example, a UE adjacent to the BS may transfer cell-specific information that is received through the SIB 700 or the higher layer signaling 720, to a UE located in an edge-of-cell-coverage UE through a D2D SA resource 760. Although the D2D SA resource 760 is a resource specific to a UE, information transmitted through the D2D SA resource 760 may be information common to a plurality of UEs included in a UE group. For example, the SIB 700 or the higher layer signaling 720 may include broadcasted SIB information or an RRC signaling configured for a predetermined UE.

In the case of second mode communication, cell-specific information for D2D communication may be signaled through a predetermined D2D channel (for example, a PD2DSCH) 780. For example, a UE corresponding to an ISS transmits cell-specific information for D2D communication to a UE outside coverage (an out-of-coverage UE) through a predetermined D2D channel. Alternatively, cell-specific information for D2D communication may be transmitted between UEs through a D2D SA resource 790. Although the D2D SA resource 790 is a resource specific to a UE, information transmitted through the D2D SA resource 790 may be information common to a plurality of UEs included in a UE group.

Figure 8:
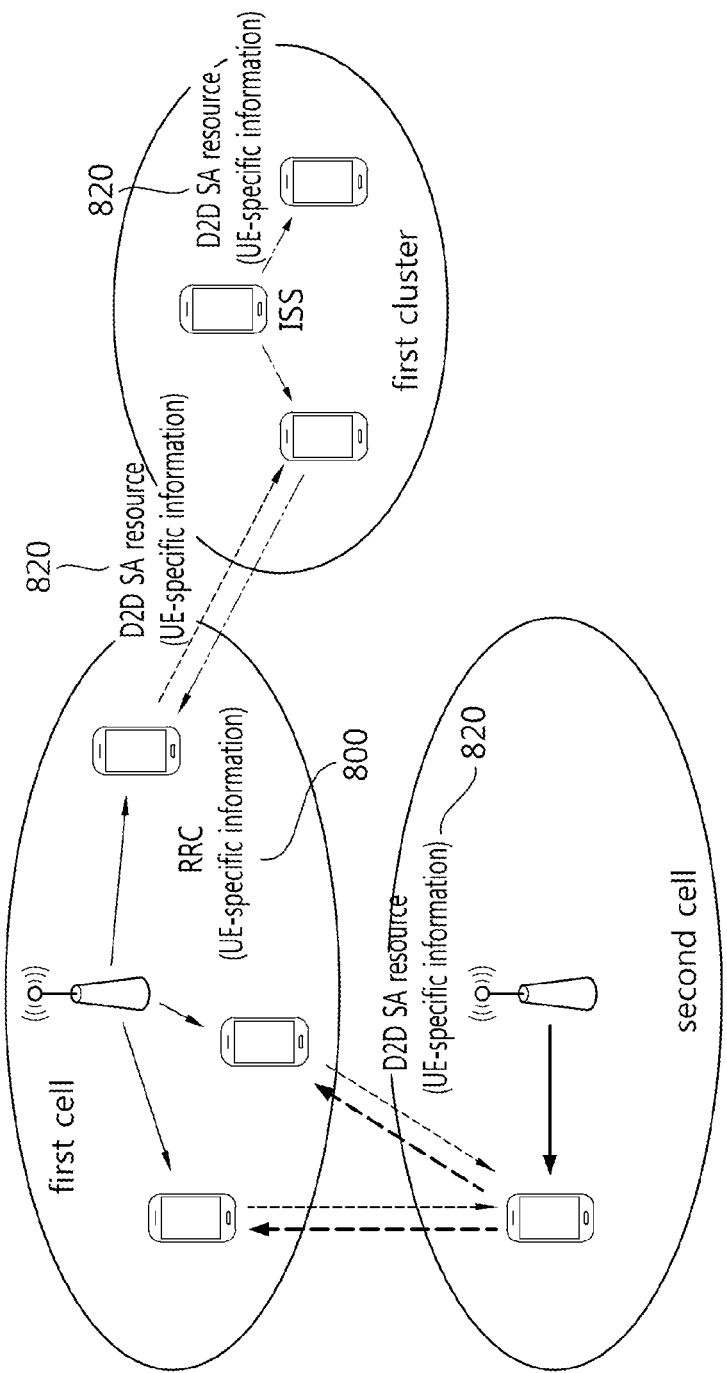
FIG. 8 is a conceptual diagram illustrating a method of transmitting information for D2D communication according to an exemplary embodiment.

FIG. 8 is a conceptual diagram illustrating a method of transmitting information for D2D communication according to an exemplary embodiment.

FIG. 8 discloses a method of transmitting UE-specific information or UE group-specific information for D2D communication.

The UE-specific information (or UE group-specific information) for D2D communication may be indicated based on a UE identifier. For example, a UE identifier may be allocated to a UE through a D2D SA resource 820 or the like. UE-specific information (or UE group-specific information) for D2D communication may be determined based on a rule or a numerical formula (for example, a modular arithmetic) defined in advance based on a UE identifier allocated to a UE.

Also, UE-specific information (or UE group-specific information) for D2D communication may be transmitted to a UE, through an RRC signaling 800 or a D2D SA communication resource 820.

Cell-specific information for D2D communication and UE-specific information for D2D communication may be transmitted to a UE through various signaling methods disclosed in FIGS. 7 and 8.

In the case of cell-specific information for D2D communication, the following various signaling methods may be used for transmission to a UE.

For example, cell-specific information for D2D communication may be transmitted to a UE as a signaling through an SIB. In this instance, an in-coverage UE may receive, from a BS (eNodeB), a signaling associated with cell-specific information through an SIB.

As another example, cell-specific information for D2D communication may be transmitted to a UE as a signaling through an SIB and a PD2DSCH. In this instance, an in-coverage UE may receive, from a BS, a signaling associated with cell-specific information through an SIB. Also, an edge-of-cell-coverage UE may receive, from an in-coverage D2D UE, a signaling associated with cell-specific information through a PD2DSCH.

As another example, cell-specific information for D2D communication may be transmitted to a UE as a signaling through a PD2DSCH. In this instance, an out-of-coverage UE may receive a signaling associated with cell-specific information through a PD2DSCH, from an ISS or another out-of-coverage D2D UE.

As another example, cell-specific information for D2D communication may be transmitted to a UE as a signaling through an SIB and an SA. In this instance, an in-coverage D2D UE may receive, from a BS, the signaling through the SIB, and the edge-of-cell-coverage D2D UE may receive the signaling through the SA from the in-coverage D2D UE.

Here, the signaling through the SA is a dedicated signaling which is specific to each UE, but actually, it may be configured to be common to a plurality of UEs included in a UE group.

As another example, cell-specific information for D2D communication may be transmitted to a UE as a signaling through an SA. In this instance, an out-of-coverage D2D UE may receive a signaling associated with cell-specific information through an SA, from an ISS or another out-of-coverage D2D UE. Here, the signaling through the SA is a dedicated signaling which is specific to each UE, but actually, it may be configured to be common to a plurality of UEs included in a UE group.

As another example, cell-specific information for D2D communication may be transmitted to a UE as a higher layer signaling such as an RRC or the like. In this instance, an RRC-connected D2D UE may receive, from a BS (eNodeB), a signaling associated with cell-specific information through an RRC. Here, a higher layer signaling such as an RRC or the like is a dedicated signaling which is specific to each UE, but actually, it may be configured to be common to a plurality of UEs included in a UE group.

In the case of UE-specific information for D2D communication, the following various signaling methods may be used for transmission to a UE.

For example, UE-specific information for D2D communication may be transmitted to a UE through a UE identifier. Here, the UE identifier may be a UE identifier included in an SA. In this instance, a SA receiving D2D UE may receive an SA including the UE identifier from an SA transmitting D2D UE.

As another example, UE-specific information for D2D communication may be transmitted to a UE as a higher layer signaling such as an RRC or the like. In this instance, an RRC-connected D2D UE may receive, from a BS (eNodeB), a signaling associated with UE-specific information through an RRC. Here, a higher layer signaling such as an RRC or the like, may be configured as a dedicated signaling which is specific to each UE.

As another example, UE-specific information for D2D communication may be transmitted to a UE through an SA. In this instance, an SA receiving D2D UE may receive a signaling associated with UE-specific information through an SA, from an SA transmitting D2D UE. Here, a signaling through the SA may be configured as a dedicated signaling which is specific to each UE.

In the case of transmitting cell-specific information for D2D communication and/or UE-specific information for D2D communication to a UE through a higher layer signaling such as an RRC or the like, a default value may be indicated as a signaling value for an RRC idle D2D UE. For example, when one of 2 and 3 is indicated, through an RRC, as a D2D data transmission resource offset value for an RRC-connected D2D UE, 2 which is a default value may be used as a D2D data transmission resource offset value for an RRC idle D2D UE.

In the case in which the first mode communication is actually set for a D2D UE and the D2D UE that is set to operate as the first mode communication needs to utilize a D2D resource pool for second mode communication (for example, in the case in which a BS configures a D2D resource pool (D2D reception resource pool) for the first mode communication, and a D2D resource pool (D2D transmission resource pool and D2D reception resource pool) for the second mode communication is needed to be indicated for exceptional cases, or the like), when the BS does not indicate information associated with the D2D resource pool for the second mode communication through an SIB, the following methods may be considered.

First, information associated with both the D2D transmission resource pool and the D2D reception resource pool of the second mode communication may be configured in advance through a higher layer signaling such as an RRC or the like. As another method, the D2D reception resource pool of the second mode communication has a configuration identical to that of the D2D reception resource pool of the first mode communication, and information associated with the D2D transmission resource pool of the second mode communication may be configured in advance through a higher layer signaling such as an RRC or the like. As another method, the D2D reception resource pool of the second mode communication may have a configuration identical to that of the D2D reception resource pool of the first mode communication, and the D2D transmission resource pool of the second mode communication may have a configuration identical to that of the D2D reception resource pool of the second mode communication.

Hereinafter, an example of a combination of various signaling methods disclosed in FIGS. 7 and 8 for transmitting cell-specific information and UE-specific information for D2D communication, will be disclosed. This is merely an example, and it is apparent that other various combinations are also possible based on the above described signaling methods.

(1) First Signaling Method

Cell-specific information for D2D communication may be transmitted to a UE through an SIB or through an SIB and a PD2DSCH. UE-specific information (or UE group-specific information) for D2D communication may be determined based on a UE identifier.

(2) Second Signaling Method

Cell-specific information for D2D communication may be transmitted to a UE through an RRC signaling. UE-specific information (or UE group-specific information) for D2D communication may also be transmitted through an RRC signaling.

Hereinafter, operations of a UE that transmits traffic data and a UE that receives traffic data in D2D communication executed in FDD or TDD, will be described.

Figure 9:
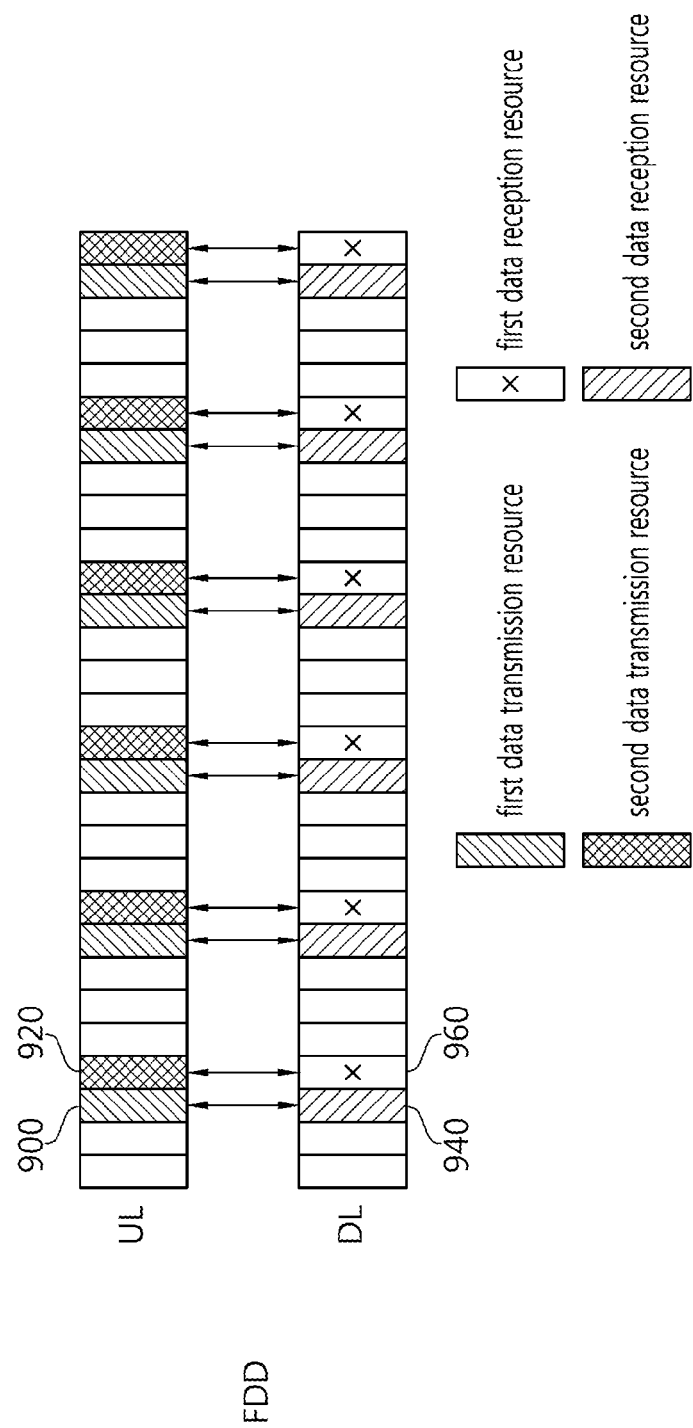
FIG. 9 is a conceptual diagram illustrating operations of a first UE and a second UE in FDD, according to an exemplary embodiment.

FIG. 9 is a conceptual diagram illustrating operations of a first UE and a second UE in FDD, according to an exemplary embodiment.

Referring to FIG. 9, a D2D data transmission resource may be determined based on a D2D data transmission resource determining method disclosed in FIGS. 4 to 8. A D2D data reception resource may be determined through various methods. For example, when a first UE and a second UE support full-duplex, a D2D data transmission resource and a D2D data reception resource are identical on time axis, and transmission and reception of data may be executed in parallel. As another example, when the first UE and the second UE support half duplex, a D2D data transmission resource and a D2D data reception resource on time axis may be separately configured. A UE that supports the half duplex may transmit traffic data through a part or the entirety of a D2D data transmission resource, and may receive traffic data from another UE by monitoring a separate D2D data reception resource.

Hereinafter, exemplary embodiments provide descriptions under an assumption that a UE supports half duplex and a D2D data transmission resource and a D2D data reception resource are separately configured.

When it is assumed that a first UE and a second UE execute D2D communication, a first D2D data transmission resource 900 of the first UE may be a second D2D data reception resource 940 of the second UE, on the time axis. That is, the second UE may monitor a resource corresponding to the first D2D data transmission resource 900 of the first UE as the second D2D data reception resource 940, on the time axis. To this end, a UE should be aware of information associated with a D2D data transmission resource of another UE that executes D2D communication. The information associated with the D2D data transmission resource of the other UE that executes D2D communication may be transmitted to a UE through various methods (for example, a D2D SA resource, an SIB, or the like). The information associated with the D2D data transmission resource of the other UE may be D2D data transmission resource allocation information, which is UE-specific information of the other UE.

When the UE is not aware of the information associated with the D2D data transmission resource of the other UE that executes D2D communication, the UE may execute monitoring associated with remaining resources excluding the D2D data transmission resource, and may receive traffic data from the other UE. Hereinafter, descriptions will be provided by assuming that a UE is aware of information associated with a D2D data transmission resource of another UE that executes D2D communication.

The first D2D data transmission resource 900 of the first UE may be determined based on cell-specific information and UE-specific information associated with the first UE. The second D2D data transmission resource 920 of the second UE may be determined based on cell-specific information and UE-specific information associated with the second UE. The first UE and the second UE may be grouped into predetermined UE groups based on the UE-specific information associated with the first UE and the UE-specific information associated with the second UE.

For example, unit D2D data transmission resources corresponding to even-numbered indices from among the unit D2D data transmission resources corresponding to indices from 0 to M−1, may be the D2D data transmission resource 900 for a first UE group including the first UE. For example, unit D2D data transmission resources corresponding to even-numbered indices from among the unit D2D data transmission resources corresponding to indices from 0 to M−1, may be the D2D data transmission resource 920 for a second UE group including the second UE. In this instance, a resource corresponding to the second D2D data transmission resource 920 on the time axis, may be the first D2D data reception resource 960 of the first UE. Also, a resource corresponding to the first D2D data transmission resource 900 may be the second D2D data reception resource 940 of the second UE, on the time axis.

The first UE may transmit traffic data through the first D2D data transmission resource 900 allocated out of the first D2D data transmission resource. Also, the first UE monitors the first D2D data reception resource 960 (the second D2D data transmission resource), and may receive traffic data transmitted from the second UE.

The second UE may transmit traffic data through the second D2D data transmission resource 900 allocated out of the second D2D data transmission resource. Also, the second UE monitors the second D2D data reception resource (the first D2D data transmission resource), and may receive traffic data transmitted from the first UE.

When a third UE that executes D2D communication with the first UE is added, the first D2D data reception resource of the first UE may additionally include a third D2D data transmission resource of the third UE. That is, the first UE may monitor the second D2D data transmission resource of the second UE and the third D2D data transmission resource of the third UE, as the D2D data reception resource of the first UE.

Figure 10:
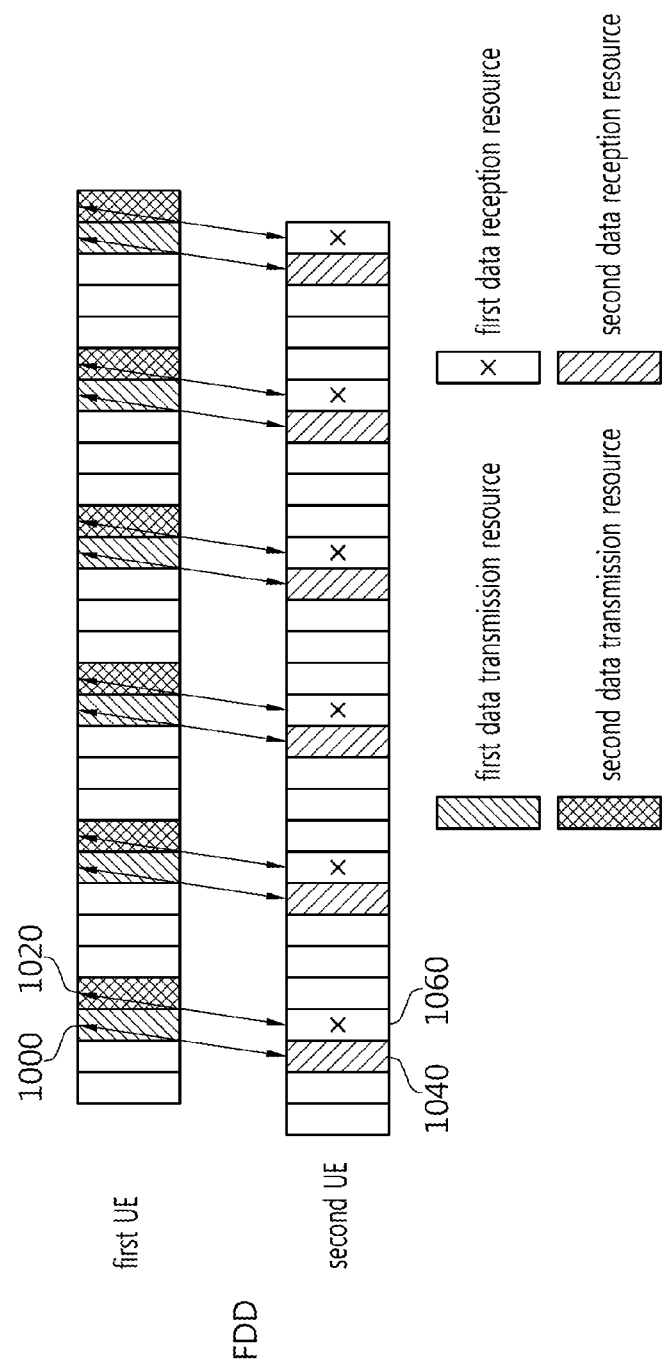
FIG. 10 is a conceptual diagram illustrating operations of a first UE and a second UE in TDD, according to an exemplary embodiment.

FIG. 10 is a conceptual diagram illustrating operations of a first UE and a second UE in TDD, according to an exemplary embodiment.

FIG. 10 assumes that a first UE and a second UE execute TDD-based D2D communication.

In TDD, a D2D data transmission resource may be determined based on a D2D data transmission resource determining method disclosed in FIGS. 4 to 8.

It is assumed that information associated with a D2D data transmission resource of another UE that executes D2D communication is transmitted to a UE through various methods (for example, a D2D SA resource, an SIB, or the like). In this instance, a resource corresponding to a second D2D data transmission resource 1060 may be a first D2D data reception resource 1020 of the first UE on the time axis, like the above described case of FDD. Also, a resource corresponding to the first D2D data transmission resource 1000 may be the second D2D data reception resource 1040 of the second UE, on the time axis.

The first UE may transmit traffic data through a part or the entirety selected out of the first D2D data transmission resource 1000. Also, the first UE monitors the first D2D data reception resource 1020 (the second D2D data transmission resource), and may receive traffic data transmitted from the second UE.

The second UE may transmit traffic data through a part or the entirety selected out of the second D2D data transmission resource 1040. Also, the second UE monitors the second D2D data reception resource 1060 (the first D2D data transmission resource), and may receive traffic data transmitted from the first UE.

When a third UE that executes D2D communication with the first UE is added, the first D2D data reception resource of the first UE may additionally include a third D2D data transmission resource of the third UE. That is, the first UE may monitor the second D2D data transmission resource of the second UE and the third D2D data transmission resource of the third UE, as the D2D data reception resource of the first UE.

When information associated with a D2D data transmission resource of another UE that executes D2D communication based on FDD or TDD is not transmitted to a UE, the UE may determine a resource excluding the D2D data transmission resource as a D2D data reception resource.

Figure 11:
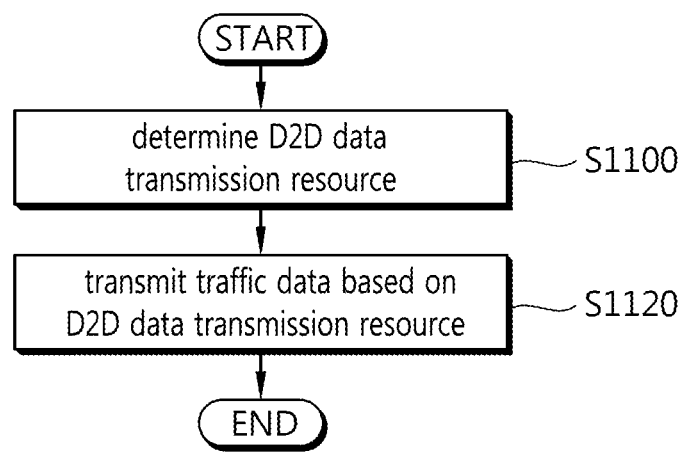
FIG. 11 is a flowchart illustrating a traffic data transmission operation of a UE according to an exemplary embodiment.

FIG. 11 is a flowchart illustrating a traffic data transmitting operation of a UE according to an exemplary embodiment.

Referring to FIG. 11, a UE determines a D2D data transmission resource based on cell-specific information for D2D communication and UE-specific information (UE group-specific information) for D2D communication, in operation S1100.

For example, a UE may receive cell-specific information for D2D communication (for example, information associated with a D2D data allocation period, information associated with a D2D data transmission resource offset, information associated with a D2D data transmission resource bitmap, and information associated with the number of repetitions of a D2D data transmission resource bitmap) and UE-specific information for D2D communication (for example, D2D data transmission resource allocation information), through above described various methods (an SIB, a PD2DSC, an RRC, a D2D SA resource, or the like). The D2D data transmission resource may be determined based on a D2D data transmission resource determining method disclosed in FIGS. 4 to 8.

The UE transmits traffic data based on the determined D2D data transmission resource in operation S1120.

The UE may transmit traffic data through a part or the entirety of the determined D2D data transmission resource.

A UE that fails to obtain synchronization for D2D communication, may execute synchronization by taking into consideration information associated with a starting point of a D2D data allocation period and/or a location of a current subframe allocated in the D2D data allocation period, and may transmit traffic data. For example, a UE that executes initial access for D2D communication may obtain information associated with a starting point of the D2D data allocation period, based on a subframe number of a system frame number (SFN), and may be assigned with a D2D data transmission resource after the starting point of the D2D data allocation period.

Alternatively, a UE that executes initial access for D2D communication may obtain information associated with a starting point of the D2D data allocation period, based on a subframe number of a system frame number (SFN), and may be assigned with a D2D data transmission resource after a predetermined point of the D2D data allocation period.

Figure 12:
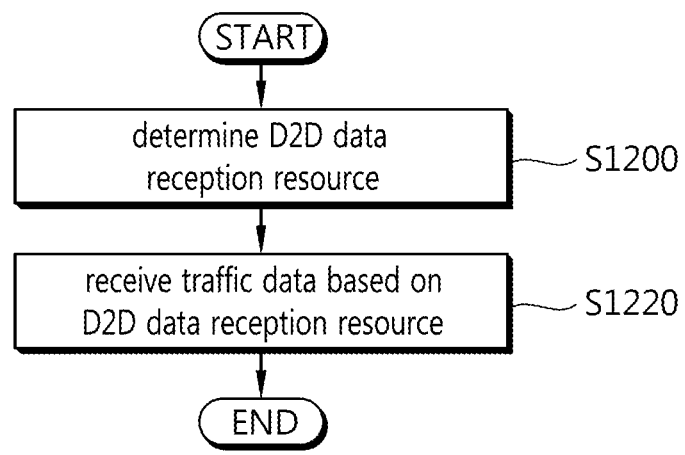
FIG. 12 is a flowchart illustrating a traffic data reception operation of a UE according to an exemplary embodiment.

FIG. 12 is a flowchart illustrating a traffic data reception operation of a UE according to an exemplary embodiment.

Referring to FIG. 12, a UE determines a D2D data reception resource based on information associated with a D2D data transmission resource of another UE that executes D2D communication, in operation S1200.

For example, a UE may receive information associated with a D2D data transmission resource of another UE, through above described various methods (an SIB, a PD2DSC, an RRC, a D2D SA resource, or the like). Cell-specific information between the UE and the other UE are identical, and thus, the UE may receive UE-specific information of the other UE as information associated with a D2D data transmission resource of the other.

The UE receives traffic data based on the determined D2D data reception resource in operation S1220.

The UE may monitor the determined D2D data reception resource, so as to receive traffic data transmitted from the other UE. In the same manner as the transmission of traffic data, a UE that fails to obtain synchronization for D2D communication, may execute synchronization by taking into consideration information associated with a starting point of a D2D data allocation period and/or a location of a current subframe allocated in the D2D data allocation period, and may transmit traffic data.

Figure 13:
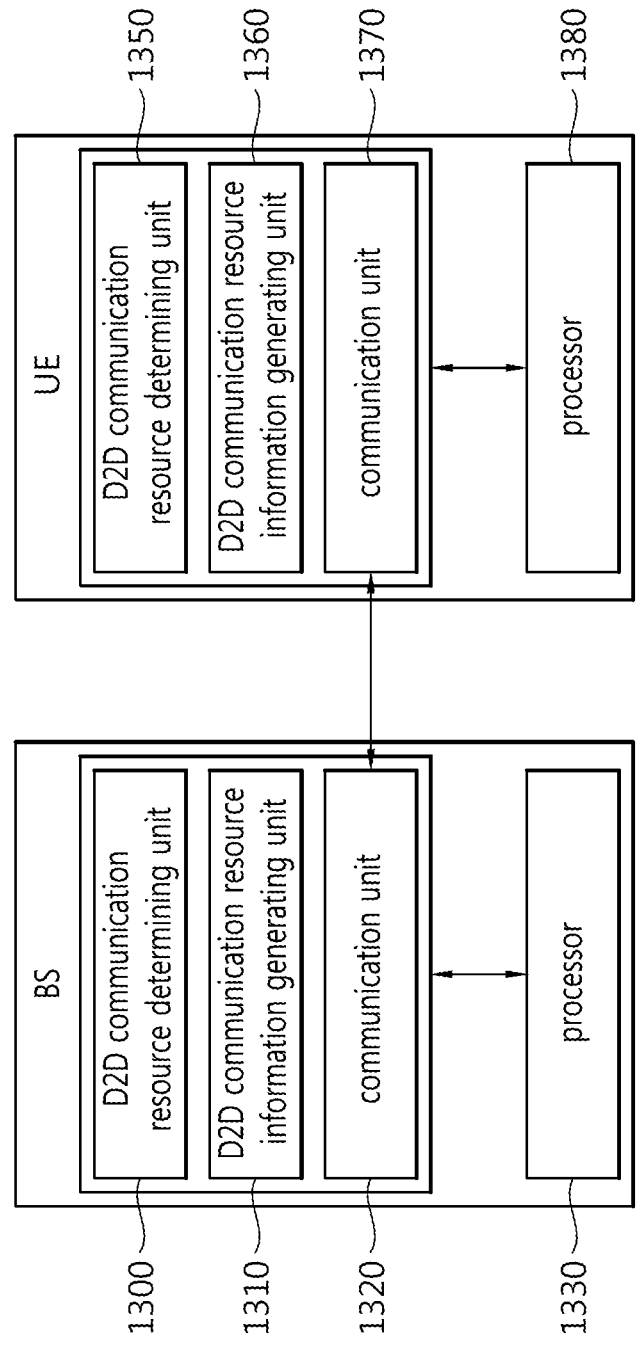
FIG. 13 is a block diagram illustrating a Base Station (BS) and a UE according to an exemplary embodiment.

FIG. 13 is a block diagram illustrating a BS and a UE according to an exemplary embodiment.

Referring to FIG. 13, a BS may include a D2D communication resource determining unit 1300, a D2D communication resource information generating unit 1310, a communication unit 1320, and a processor 1330. A UE may include a D2D communication resource determining unit 1350, a D2D communication resource information generating unit 1360, a communication unit 1370, and a processor 1380. The component elements of the UE and the BS disclosed in FIG. 13 are configured for illustrative purposes, and a single component element may be embodied as a plurality of component elements or a plurality of component elements may be embodied as a single component element.

The component elements of the UE and the BS may be embodied for executing the operations of the BS and the UE, which have been described in FIGS. 4 to 12. For example, the component elements of the BS and the UE may execute the following operations.

A D2D communication resource determining unit 1300 of the BS may be embodied to determine a D2D data transmission resource and a D2D data reception resource of a UE that executes D2D communication. For example, in the case of a first mode communication, the D2D communication resource determining unit 1300 of the BS may set a D2D data allocation period, a D2D data transmission resource offset, a D2D data transmission resource bitmap, the number of repetitions of a D2D data transmission resource bitmap to be identical to one another with respect to a UE group including a plurality of UEs in a cell, so as to determine a D2D data transmission resource for the group of the plurality of UEs.

Also, the D2D communication resource determining unit 1300 may determine a part or the entirety of the D2D data transmission resource as a D2D data transmission resource for individual UE included in a UE group or for each of a plurality of UE groups.

The D2D communication resource information generating unit 1310 of the BS may be embodied to generate the D2D data transmission resource or the D2D data reception resource, which is determined based on the D2D communication resource determining unit 1300. For example, the D2D communication resource information generating unit 1310 of the BS may generate information associated with a D2D data transmission resource offset, information associated with a D2D data transmission resource bitmap, and information associated with the number of repetitions of a D2D data transmission resource bitmap, as cell-specific information. Alternatively, the D2D communication resource information generating unit 1310 of the BS is UE-specific information (or UE group-specific information), and may generate a part or the entirety of a D2D data transmission resource, as D2D data transmission resource allocation information associated with a D2D data transmission resource for an individual UE included in a UE group or for each of a plurality of UE groups.

The communication unit 1320 of the BS may be embodied to transmit, to an in-coverage UE, cell-specific information and UE-specific information (or UE group-specific information) for D2D communication generated by the D2D data resource allocation information generating unit 1310.

The processor 1330 of the BS may be embodied to control operations of the D2D communication resource determining unit 1300, the D2D communication resource information generating unit 1310, and the communication unit 1320.

The D2D communication resource determining unit 1350 of the UE may set and determine a D2D data allocation period, a D2D data transmission resource offset, a D2D data transmission resource bitmap, the number of repetitions of a D2D data transmission resource bitmap to be identical to one another, with respect to a UE group including a plurality of UEs determined based on an ISS, so as to determine a D2D data transmission resource for the group of the plurality of UEs. Also, the D2D communication resource determining unit 1350 may determine a part or the entirety of the D2D data transmission resource as a D2D data transmission resource for individual UE included in a UE group or for each of a plurality of UE groups.

The D2D communication resource determining unit 1350 may set different D2D data transmission resource offset values for individual UEs included in a UE group or a plurality of UE groups.

The D2D communication resource information generating unit 1360 of the UE may be embodied to generate information associated with the D2D data transmission resource or the D2D data reception resource, which is determined based on the D2D communication resource determining unit 1350. For example when the UE is an ISS in the second mode communication, the UE may generate cell-specific information and UE-specific information (or UE group-specific information) to be transmitted to another UE.

When the UE is an ISS, the D2D communication resource determining unit 1350 of the UE and the D2D communication resource information generating unit 1360 of the UE may operate. Alternatively, the D2D communication resource determining unit 1350 of the UE may operate to transmit information associated with a D2D data reception resource to be monitored by another UE.

The communication unit 1370 of the UE may be embodied to transmit, to a UE, cell-specific information and UE-specific information (or UE group-specific information) for D2D communication generated by the D2D communication resource information generating unit 1360. Alternatively, when the UE is not an ISS, the communication unit 1370 may be embodied to receive generated cell-specific information and UE-specific information (or UE group-specific information) for D2D communication, from another UE or the BS. Alternatively, the communication unit 1370 may be embodied to transmit, to another UE that executes D2D communication, information associated with a D2D data reception resource to be monitored.

The processor 1380 of the UE may be embodied to control operations of the D2D communication resource determining unit 1350 of the UE, the D2D communication resource information generating unit 1360 of the UE, and the communication unit 1370 of the UE.

According to an exemplary embodiment, the D2D communication resource determining unit 1350 and the D2D communication resource information generating unit 1360 may be configured in one or more processors, e.g., the processor 1380. The communication unit 1370 may be or the UE separately include a wireless transceiver.

The wireless transceiver may receive configuration information associated with a D2D data transmission resource, the configuration information including information of a D2D data allocation period and being transmitted from an evolved NodeB (eNB). One or more processors in association with one or more memories, e.g., the processor 1380, the D2D communication resource determining unit 1350, and the D2D communication resource information generating unit 1360, may determine a D2D data transmission resource offset and a period associated with a D2D data transmission resource bitmap in each D2D data allocation period, the D2D data transmission resource bitmap including at least one bit corresponding to bit value "1". The one or more processors may further determine a pool of subframes corresponding to the bit value "1" of the D2D data transmission resource bitmap, the period associated with the D2D data transmission resource bitmap including the pool of subframes, the pool of subframes corresponding to D2D data transmission resources through which a D2D data transmission is capable.

The wireless transceiver may be configured to receive information of the D2D data transmission resource offset and information of the D2D data transmission resource bitmap transmitted from the eNB. Referring to FIG. 4, a start point of the period associated with the D2D data transmission resource bitmap may be determined based on a start point of each D2D data allocation period and the D2D data transmission resource offset. A plurality of repetitions of the D2D data transmission resource bitmap may correspond to uplink subframes in the period associated with the D2D data transmission resource bitmap.

Further, a plurality of repetitions of the D2D data transmission resource bitmap may be associated with the period associated with the D2D data transmission resource bitmap as shown in e.g., FIG. 4. The pool of subframes corresponding to the bit value "1" of the D2D data transmission resource bitmap may have a repetitive pattern in the period associated with the D2D data transmission resource bitmap in accordance with the plurality of repetitions of the D2D data transmission resource bitmap. The D2D data transmission resource offset indicated as a number of subframes.

According to an exemplary embodiment, the communication unit 1370 may receive configuration information associated with a D2D data transmission resource, the configuration information including information of a D2D data allocation period, information of a D2D data transmission resource offset, and information of a D2D data transmission resource bitmap. The one or more processors may determine a D2D data transmission resource in the D2D data allocation period among uplink subframes configured based on a radio frame structure of a Frequency Division Duplexing (FDD) scheme or a Time Division Duplexing (TDD) scheme, each radio frame according to the radio frame structure including 10 subframes. The one or more processors may determine, within the D2D data allocation period, a plurality of repetitions of a D2D data transmission resource bitmap based on the D2D data transmission resource offset. In an example, the one or more processors may determine uplink subframes in a period associated with the D2D data transmission resource bitmap, the period associated with the D2D data transmission resource bitmap being preceded by the D2D data transmission resource offset and included in the D2D data allocation period. Then, the one or more processors may associate (or map) the D2D data transmission resource bitmap with the uplink subframes in the period associated with the D2D data transmission resource bitmap, the D2D data transmission resource bitmap including at least one bit corresponding to bit value "1", each bit of the D2D data transmission resource bitmap being associated with one of the uplink subframes in the period associated with the D2D data transmission resource bitmap. The one or more processors may determine a pool of uplink subframes corresponding to the bit value "1" of the D2D data transmission resource bitmap and located in the period associated with the D2D data transmission resource bitmap, the pool of uplink subframes corresponding to D2D data transmission resources through which a D2D data transmission is capable.

The uplink subframes in the period associated with the D2D data transmission resource bitmap may be arranged in an ascending order of the radio frame structure, and the D2D data transmission resource bitmap may be associated with the arranged uplink subframes in the period associated with the D2D data transmission resource bitmap in an order from the most significant bit to the least significant bit. Referring to FIG. 4, after associating the least significant bit, the D2D data transmission resource bitmap is repeated in the association with the arranged uplink subframes in the order from the most significant bit to the least significant bit. A start point of the period associated with the D2D data transmission resource bitmap may be determined based on a start point of the D2D data allocation period and the data transmission resource offset. The data transmission resource offset may correspond to an offset between the start point of the D2D data allocation period and the start point of the period associated with the D2D data transmission resource bitmap. A plurality of D2D data allocation periods each includes the data transmission resource offset and the period associated with the D2D data transmission resource bitmap.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A method of determining a device-to-device (D2D) data transmission resource for a user equipment (UE), the method comprising:
   receiving, at a UE, configuration information associated with a D2D data transmission resource, the configuration information comprising information of a D2D data allocation period and being transmitted from an evolved NodeB (eNB);
   determining, in each D2D data allocation period, a D2D data transmission resource offset and a duration associated with a D2D data transmission resource bitmap, the D2D data transmission resource bitmap comprising at least one bit corresponding to bit value "1"; and
   determining a pool of subframes corresponding to the bit value "1" of the D2D data transmission resource bitmap, the duration associated with the D2D data transmission resource bitmap comprising the pool of subframes, the pool of subframes corresponding to D2D data transmission resources through which a D2D data transmission is capable,
   wherein a plurality of repetitions of the D2D data transmission resource bitmap correspond to uplink subframes in the duration associated with the D2D data transmission resource bitmap.

2. The method of claim 1, further comprising:
   receiving, at the UE, information of the D2D data transmission resource offset and information of the D2D data transmission resource bitmap transmitted from the eNB.

3. The method of claim 1, wherein:
   a start point of the duration associated with the D2D data transmission resource bitmap is determined based on a start point of each D2D data allocation period and the D2D data transmission resource offset.

4. The method of claim 1, wherein:
a plurality of repetitions of the D2D data transmission resource bitmap are associated with the duration associated with the D2D data transmission resource bitmap; and
the pool of subframes corresponding the bit value "1" of the D2D data transmission resource bitmap has a repetitive pattern in the duration associated with the D2D data transmission resource bitmap in accordance with the plurality of repetitions of the D2D data transmission resource bitmap.

5. The method of claim 1, wherein:
the D2D data transmission resource offset is indicated as a number of subframes.

6. The method of claim 1, wherein:
the D2D data allocation period is repeated a plurality of times in a time axis; and
in each D2D data allocation period, the D2D data transmission resource offset precedes the duration associated with a D2D data transmission resource bitmap.

7. A user equipment (UE) to determine a device-to-device (D2D) data transmission resource comprising:
a wireless transceiver configured to:
receive configuration information associated with a D2D data transmission resource, the configuration information comprising information of a D2D data allocation period and being transmitted from an evolved NodeB (eNB); and
one or more processors configured to:
determine, in each D2D data allocation period, a D2D data transmission resource offset and a duration associated with a D2D data transmission resource bitmap, the D2D data transmission resource bitmap comprising at least one bit corresponding to bit value "1"; and
determine a pool of subframes corresponding to the bit value "1" of the D2D data transmission resource bitmap, the duration associated with the D2D data transmission resource bitmap comprising the pool of subframes, the pool of subframes corresponding to D2D data transmission resources through which a D2D data transmission is capable,
wherein a plurality of repetitions of the D2D data transmission resource bitmap correspond to uplink subframes in the duration associated with the D2D data transmission resource bitmap.

8. The UE of claim 7, wherein:
the D2D data allocation period is repeated a plurality of times in a time axis; and
in each D2D data allocation period, the D2D data transmission resource offset precedes the duration associated with a D2D data transmission resource bitmap.

9. The UE of claim 8, wherein the wireless transceiver is configured to receive information of the D2D data transmission resource offset and information of the D2D data transmission resource bitmap transmitted from the eNB.

10. The UE of claim 8, wherein:
a start point of the duration associated with the D2D data transmission resource bitmap is determined based on a start point of each D2D data allocation period and the D2D data transmission resource offset.

11. The UE of claim 8, wherein:
a plurality of repetitions of the D2D data transmission resource bitmap are associated with the duration associated with the D2D data transmission resource bitmap; and
the pool of subframes corresponding the bit value "1" of the D2D data transmission resource bitmap has a repetitive pattern in the duration associated with the D2D data transmission resource bitmap in accordance with the plurality of repetitions of the D2D data transmission resource bitmap.

12. The UE of claim 8, wherein:
the D2D data transmission resource offset is indicated as a number of subframes.

13. A method of determining a device-to-device (D2D) data transmission resource for a user equipment (UE), the method comprising:
receiving, at a UE, configuration information associated with a D2D data transmission resource, the configuration information comprising information of a D2D data allocation period, information of a D2D data transmission resource offset, and information of a D2D data transmission resource bitmap; and
determining, at the UE, a D2D data transmission resource in the D2D data allocation period among uplink subframes configured based on a radio frame structure of a Frequency Division Duplexing (FDD) scheme or a Time Division Duplexing (TDD) scheme, each radio frame, according to the radio frame structure, comprising 10 subframes,
wherein the determining of the D2D data transmission resource comprises:
determining, within the D2D data allocation period, a plurality of repetitions of a D2D data transmission resource bitmap based on the D2D data transmission resource offset;
determining uplink subframes in a duration associated with the D2D data transmission resource bitmap, the duration associated with the D2D data transmission resource bitmap being preceded by the D2D data transmission resource offset and included in the D2D data allocation period;
associating the D2D data transmission resource bitmap with the uplink subframes in the duration associated with the D2D data transmission resource bitmap, the D2D data transmission resource bitmap comprising at least one bit corresponding to bit value "1", each bit of the D2D data transmission resource bitmap being associated with one of the uplink subframes in the duration associated with the D2D data transmission resource bitmap; and
determining a pool of uplink subframes corresponding to the bit value "1" of the D2D data transmission resource bitmap and located in the duration associated with the D2D data transmission resource bitmap, the pool of uplink subframes corresponding to D2D data transmission resources through which a D2D data transmission is capable.

14. The method of claim 13, wherein:
the uplink subframes in the duration associated with the D2D data transmission resource bitmap are arranged in an ascending order of the radio frame structure; and
the D2D data transmission resource bitmap is associated with the arranged uplink subframes in the duration associated with the D2D data transmission resource bitmap in an order from the most significant bit to the least significant bit.

15. The method of claim 14, wherein:
after associating the least significant bit, the D2D data transmission resource bitmap is repeated in the association with the arranged uplink subframes in the order from the most significant bit to the least significant bit.

16. The method of claim 14, wherein:
a start point of the duration associated with the D2D data transmission resource bitmap is determined based on a start point of the D2D data allocation period and the data transmission resource offset.

17. The method of claim 16, wherein:
the data transmission resource offset corresponds to an offset between the start point of the D2D data allocation period and the start point of the duration associated with the D2D data transmission resource bitmap.

18. The method of claim 14, wherein:
a plurality of D2D data allocation periods each comprises the data transmission resource offset and the duration associated with the D2D data transmission resource bitmap.

* * * * *